United States Patent
Hottovy et al.

(10) Patent No.: US 9,579,619 B2
(45) Date of Patent: Feb. 28, 2017

(54) TEMPERATURE CONTROL FOR POLYMERIZING PARTICULATE POLYOLEFIN

(71) Applicant: Chevron Phillips Chemical Company LP, The Woodlands, TX (US)

(72) Inventors: John D. Hottovy, Porter, TX (US); Gregory G. Hendrickson, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 143 days.

(21) Appl. No.: 14/607,720

(22) Filed: Jan. 28, 2015

(65) Prior Publication Data
US 2016/0215080 A1    Jul. 28, 2016

(51) Int. Cl.
*C08F 110/02* (2006.01)
*C08F 2/14* (2006.01)
(Continued)

(52) U.S. Cl.
CPC ............ *B01J 8/1809* (2013.01); *B01J 8/20* (2013.01); *B01J 19/002* (2013.01);
(Continued)

(58) Field of Classification Search
CPC . C08F 2/14; C08F 2/34; C08F 2400/02; B01J 19/0013; B01J 2219/00051
(Continued)

(56) References Cited

U.S. PATENT DOCUMENTS

| 3,248,179 A | 4/1966 | Norwood |
| 4,501,885 A | 2/1985 | Sherk et al. |
| (Continued) | | |

FOREIGN PATENT DOCUMENTS

| WO | 2008030294 A1 | 3/2008 |
| WO | 2016123018 A1 | 8/2016 |

OTHER PUBLICATIONS

Foreign communication from a related counterpart application—International Search Report and Written Opinion, PCT/US2016/014719, May 12, 2016, 8 pages.

*Primary Examiner* — Fred M Teskin
(74) *Attorney, Agent, or Firm* — Conley Rose, P.C.; Rodney B. Carroll; Monte R. Rhodes

(57) ABSTRACT

A method is described that includes contacting an olefin with a catalyst in a polymerization reactor, polymerizing at least a portion of the olefin to form an alpha olefin reaction product, detecting a condition within the polymerization reactor, determining an average temperature of at least one olefin product particle based on the condition, determining an operating particle temperature threshold using a foul curve, comparing the average temperature of the polymer particle to the operating particle temperature threshold, changing one or more operating parameters in response to the comparing, and maintaining the average temperature of the olefin polymer particle at or below the operating particle temperature threshold in response to changing the one or more operating parameters. The alpha olefin reaction product includes a plurality of olefin polymer particles, and the polymerization reactor includes a reaction mixture that includes the olefin, the catalyst, a diluent, and the alpha olefin reaction product.

27 Claims, 8 Drawing Sheets

(51) Int. Cl.
*C08F 2/34* (2006.01)
*B01J 8/20* (2006.01)
*B01J 19/18* (2006.01)
*B01J 8/18* (2006.01)
*B01J 19/00* (2006.01)

(52) U.S. Cl.
CPC ....... *B01J 19/0013* (2013.01); *B01J 19/1837* (2013.01); *B01J 2219/002* (2013.01); *B01J 2219/0022* (2013.01); *B01J 2219/00063* (2013.01); *B01J 2219/00065* (2013.01); *B01J 2219/00094* (2013.01); *B01J 2219/00162* (2013.01); *B01J 2219/00182* (2013.01); *B01J 2219/00186* (2013.01); *B01J 2219/00191* (2013.01); *B01J 2219/00204* (2013.01); *B01J 2219/00209* (2013.01); *B01J 2219/00216* (2013.01); *B01J 2219/00234* (2013.01); *B01J 2219/00238* (2013.01); *B01J 2219/00243* (2013.01); *B01J 2219/00247* (2013.01); *B01J 2219/00254* (2013.01); *C08F 2400/02* (2013.01)

(58) Field of Classification Search
USPC .............................................. 526/61; 700/269
See application file for complete search history.

(56) References Cited

U.S. PATENT DOCUMENTS

| | | | |
|---|---|---|---|
| 4,588,790 A | 5/1986 | Jenkins, III et al. | |
| 5,352,749 A | 10/1994 | DeChellis et al. | |
| 5,436,304 A | 7/1995 | Griffin et al. | |
| 5,455,314 A | 10/1995 | Burns et al. | |
| 5,565,175 A | 10/1996 | Hottovy et al. | |
| 5,575,979 A | 11/1996 | Hanson | |
| 6,239,235 B1 | 5/2001 | Hottovy et al. | |
| 6,262,191 B1 | 7/2001 | Hottovy et al. | |
| 6,833,415 B2 | 12/2004 | Kendrick et al. | |
| 7,381,777 B1 * | 6/2008 | Towles | C08F 10/02 526/59 |
| 7,619,047 B2 | 11/2009 | Yang et al. | |
| 8,106,136 B2 * | 1/2012 | Siraux | C08F 10/02 526/61 |
| 2006/0045823 A1 | 3/2006 | Shaw et al. | |
| 2006/0094590 A1 | 5/2006 | McDaniel et al. | |
| 2007/0197374 A1 | 8/2007 | Yang et al. | |
| 2009/0004417 A1 | 1/2009 | Follestad et al. | |
| 2010/0029872 A1 | 2/2010 | Jensen et al. | |
| 2010/0041842 A1 | 2/2010 | Yang et al. | |

\* cited by examiner

700

702 — CALCULATE AN ALPHA OLEFIN PRODUCT PARTICLE INTERNAL TEMPERATURE BASED ON ONE OR MORE ALPHA OLEFIN PRODUCT PARTICLE PROPERTIES AND AN AVERAGE TEMPERATURE OF A BULK FLUID SURROUNDING THE ALPHA OLEFIN PRODUCT PARTICLE

704 — DETERMINE ONE OR MORE POLYMERIZATION REACTOR OPERATING PARAMETERS BASED ON THE INTERNAL ALPHA OLEFIN PRODUCT PARTICLE TEMPERATURE

706 — CONTROL THE ONE OR MORE POLYMERIZATION REACTOR OPERATING PARAMETERS

708 — MAINTAIN A RATIO OF A MELTING TEMPERATURE OF THE ALPHA OLEFIN PRODUCT PARTICLE TO THE INTERNAL ALPHA OLEFIN PRODUCT PARTICLE TEMPERATURE AT A VALUE LESS THAN ABOUT 1.0 IN RESPONSE TO CONTROLLING THE ONE OR MORE POLYMERIZATION REACTOR OPERATING PARAMETERS

*FIG. 7*

TEMPERATURE CONTROL FOR POLYMERIZING PARTICULATE POLYOLEFIN

CROSS-REFERENCE TO RELATED APPLICATIONS

Not Applicable.

STATEMENT REGARDING FEDERALLY SPONSORED RESEARCH OR DEVELOPMENT

Not applicable.

REFERENCE TO A MICROFICHE APPENDIX

Not applicable.

FIELD

This disclosure relates to the heat transfer in a polymerization reactor system.

BACKGROUND

Polyolefins such as polyethylene and polypropylene may be prepared by a variety of polymerization process such as gas phase reactions, slurry polymerization, solution polymerization, and the like. In a slurry polymerization process, feed materials such as diluent, monomer and catalyst are introduced to a reaction zone, forming a slurry in the reaction zone. In continuous loop reactors, the slurry circulates through the reaction zone, and the monomer reacts at the catalyst in a polymerization reaction. The polymerization reaction yields solid polyolefins in the slurry. A polymerization product having solid polyolefins is then transferred from the reactor and separated to recover the solid polyolefins.

SUMMARY

In an embodiment, a method of selecting polymerization operating conditions within a polymerization reactor comprises contacting an olefin with a catalyst in a polymerization reactor, polymerizing the olefin to form an alpha olefin reaction product, detecting, by sensor, a condition within the polymerization reactor, determining, by a processor, an average temperature of the olefin polymer particle based on the condition, determining an operating particle temperature threshold using a foul curve, comparing, by the processor, the average temperature of the olefin polymer particle to the operating particle temperature threshold, changing one or more operating parameters in response to the comparing, and maintaining the average temperature of the olefin polymer particle at or below the operating particle temperature threshold in response to changing the one or more operating parameters. The alpha olefin reaction product is in the form of an olefin polymer particle, and the polymerization reactor comprises a reaction mixture comprising the olefin, the catalyst, a diluent, and the alpha olefin reaction product. The condition may comprise a bulk fluid temperature. Changing the one or more operating parameters may comprise at least one of changing a cooling fluid temperature or flowrate, and the cooling fluid may provide a cooling source on at least a portion of the exterior of the polymerization reactor. The comparing may comprise determining that the average temperature of the olefin polymer particle is above the operating particle temperature threshold, and changing the one or more operating parameters may comprise at least one of lowering a cooling fluid temperature or increasing a cooling fluid flowrate. The condition may comprise a concentration of the olefin in the reaction mixture, and changing the one or more operating parameters may comprise changing the olefin concentration in the reaction mixture. The comparing may comprise determining that the average temperature of the olefin polymer particle is above the operating particle temperature threshold, and changing the one or more operating parameters may comprise reducing the olefin concentration in the reaction mixture. The catalyst may comprise a catalyst particle, and the condition may comprise an average catalyst particle size in the polymerization reactor. Changing the one or more operating parameters may comprise changing the average catalyst particle size within the polymerization reactor. The comparing may comprise determining that the average temperature of the olefin polymer particle is above the operating particle temperature threshold, and changing the one or more operating parameters may comprise reducing the average catalyst particle size within the polymerization reactor. The condition may comprise an average olefin polymer particle size in the polymerization reactor, and changing the one or more operating parameters may comprise changing the average olefin polymer particle size within the polymerization reactor. The comparing may comprise determining that the average temperature of the olefin polymer particle is above the operating particle temperature threshold, and changing the one or more operating parameters may comprise increasing the average olefin polymer particle size fed to the polymerization reactor. The condition may comprise an operating pressure in the polymerization reactor, and changing the one or more operating parameters may comprise changing the pressure within the polymerization reactor. The comparing may comprise determining that the average temperature of the olefin polymer particle is above the operating particle temperature threshold, and changing the one or more operating parameters may comprise increasing the operating pressure in the polymerization reactor to a pressure above a vapor pressure of the reaction mixture at the average temperature of the olefin polymer particle. Determining the average temperature of the olefin polymer particle may also be based on at least one of: a composition of the catalyst, a composition of the olefin, a composition of the alpha olefin reaction product, a ratio of the surface area of the catalyst to a volume of the catalyst, a density of the alpha olefin reaction product, a composition of the diluent, a dimension of the olefin polymer particle, a dimension of the polymerization reactor, a kinetic profile of the catalyst, an initial catalyst particle dimension, a measure of a plurality of reactive sites associated with the catalyst, a pressure within the polymerization reactor, an average temperature of the reaction mixture, a flowrate of the reaction mixture, or any combination thereof. The method may also include introducing the olefin into the polymerization reactor. The comparing may comprise determining that the average temperature of the olefin polymer particle is above the operating particle temperature threshold, and changing the one or more operating parameters may comprise ceasing the introduction of the olefin into the polymerization reactor. The comparing may comprise determining that the average temperature of the olefin polymer particle is above the operating particle temperature threshold, and changing the one or more operating parameters may comprise introducing water into the polymerization reactor. Changing the one or more operating parameters may comprise introducing hydrocarbon comprising one or more hydroxyl groups into the polymerization reactor. The polymerization reactor may be a loop reactor.

In an embodiment, a polymerization process comprises contacting an alpha olefin with a catalyst in a polymerization reactor, polymerizing the olefin to form an alpha olefin reaction product, and controlling an average temperature of the one or more particles within the polymerization reactor. The alpha olefin reaction product is in the form of one or more particles, and the polymerization reactor comprises a reaction mixture comprising the olefin, the catalyst, a diluent, and the alpha olefin reaction product. The average temperature of the one or more particles is less than the melting temperature of the alpha olefin reaction product, and a ratio of the average temperature of the one or more particles to the melting temperature of the alpha olefin reaction product is greater than about 0.9. The particle may comprise a catalyst polymerization site having the alpha olefin reaction product disposed about the catalyst polymerization site, and a temperature of the catalyst polymerization site may be within about 5% of the melting temperature of the alpha olefin reaction product. A temperature of the catalyst polymerization site may be equal to or above the melting temperature of the alpha olefin reaction product. Controlling the average temperature of the particle may comprise: controlling a ratio of an average reaction mixture temperature to the average temperature of the one or more particles, wherein the ratio is less than about 0.95, controlling an olefin concentration in the reaction mixture, and/or operating the polymerization reactor at a first pressure, where the first pressure is greater than the vapor pressure of the reaction mixture at the average temperature of the particle. The catalyst may comprise catalyst particles and controlling the average temperature of the particle may comprise breaking the catalyst particles into two or more smaller particles, and/or forming the alpha olefin reaction product in a first reactor. The alpha olefin reaction product formed in the first reactor may comprise a plurality of first particles, separating the plurality of first particles, and introducing the plurality of first particles into the polymerization reactor. Controlling the average temperature of the particle may comprise: controlling the amount of active sites on the catalyst, and/or polymerizing the olefin using the catalyst, where the catalyst comprises a kinetic profile that changes during the polymerization process. The catalyst may comprise a catalyst particle, and controlling the average temperature of the particle may comprise: controlling a ratio of a surface area of the catalyst to a volume of the catalyst to greater than a threshold.

In an embodiment, a polymerization process comprises calculating an alpha olefin product particle internal temperature based on one or more alpha olefin product particle properties and an average temperature of a bulk fluid surrounding the alpha olefin product particle, determining one or more polymerization reactor operating parameters based on the alpha olefin product particle internal temperature, controlling the one or more polymerization reactor operating parameters, and maintaining a ratio of a melting temperature of the alpha olefin product particle to the alpha olefin product particle internal temperature at a value less than about 1.0 in response to controlling the one or more polymerization reactor operating parameters. The one or more alpha olefin product particle properties may comprise a first alpha olefin product particle diameter and a second alpha olefin product particle diameter. Calculating the alpha olefin product particle internal temperature may comprise: calculating a first alpha olefin product particle internal temperature at the first alpha olefin product particle diameter, calculating a second alpha olefin product particle internal temperature at the second alpha olefin product particle diameter, and generating a foul curve based on the first alpha olefin product particle internal temperature, the second alpha olefin product particle internal temperature, the first alpha olefin product particle diameter, and the second alpha olefin product particle diameter. The foul curve generated may relate an alpha olefin product particle diameter to a fouling temperature of the alpha olefin product particle within the polymerization reactor. Controlling the one or more polymerization reactor operating parameters may comprise: controlling the average temperature of the bulk fluid using the foul curve. The one or more polymerization reactor operating parameters may comprise an olefin concentration within the polymerization reactor, and controlling the one or more polymerization reactor operating parameters may comprise maintaining the olefin concentration at or below a predetermined threshold value. The one or more polymerization reactor operating parameters may comprise a pressure within the polymerization reactor, and controlling the one or more polymerization reactor operating parameters may comprise maintaining the pressure at or above a vapor pressure of the bulk fluid at the alpha olefin product particle internal temperature. The one or more polymerization reactor operating parameters may comprise an average alpha olefin product particle size within the polymerization reactor, and controlling the one or more polymerization reactor operating parameters may comprise maintaining the average alpha olefin product particle size above a predetermined threshold. The one or more polymerization reactor operating parameters may comprise an average catalyst particle size within the polymerization reactor, and controlling the one or more polymerization reactor operating parameters may comprise maintaining flow conditions within the polymerization reactor to break apart the catalyst particles and maintaining the average catalyst particle size below a predetermined threshold. Maintaining the flow conditions within the polymerization reactor may comprise maintaining a fluid velocity in the polymerization reactor above a threshold. The process may also include pumping the bulk fluid through the polymerization reactor using a pump, and maintaining the flow conditions within the polymerization reactor may comprise maintaining a pump load above a threshold.

These and other features will be more clearly understood from the following detailed description taken in conjunction with the accompanying drawings and claims.

BRIEF DESCRIPTION OF THE DRAWINGS

The following figures form part of the present specification and are included to further demonstrate certain aspects of the present invention. The invention may be better understood by reference to one or more of these figures in combination with the detailed description of specific embodiments presented herein.

FIG. 7 illustrates a flow chart of yet another embodiment of a polymerization process.

DETAILED DESCRIPTION OF THE EMBODIMENTS

For a more complete understanding of the present disclosure and the advantages thereof, reference is now made to the following brief description, taken in connection with the accompanying drawings and detailed description.

Disclosed herein are embodiments of a polymerization reactor system and a process for operating the polymerization reactor system under certain heat transfer conditions. More particularly, the systems and methods disclosed herein are useful for selecting polymerization operating conditions within a polymerization reactor, thereby allowing for the control of the polymerization process temperature.

Figure 1:
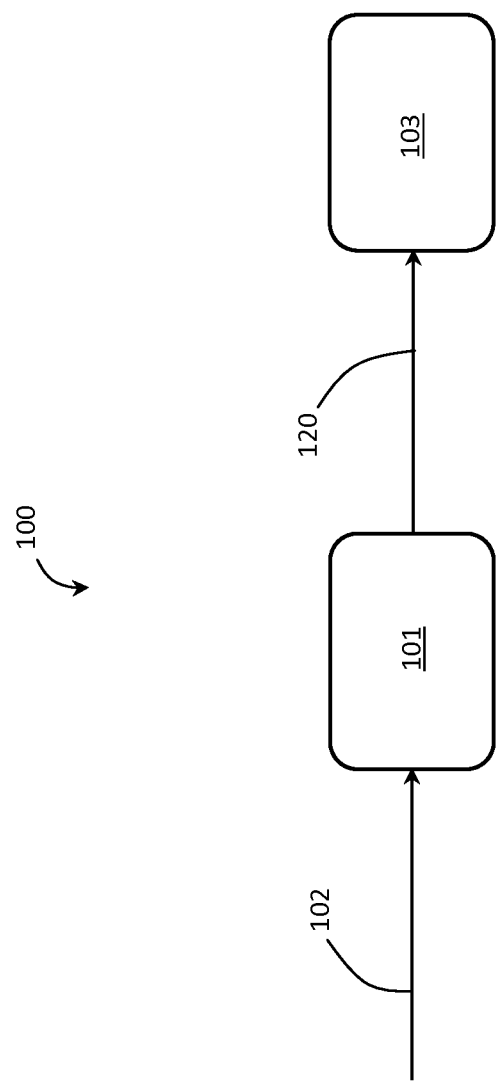
FIG. 1 schematically illustrates an embodiment of a polymerization process.

FIG. 1 illustrates a high level schematic of an embodiment of a polymerization system 100. The system 100 may comprise an inlet line 102 leading to a polymerization reactor 101, which forms polymerization product comprising a polymer particulate. A product line 120 receives the polymerization product from the polymerization reactor 101 and passes the polymerization product to a separation system 103 where the polymerization product may be recovered. The inlet line 102 may provide one or more components to the polymerization reactor 101 such as the reactants (e.g., monomer, comonomer, hydrogen, and the like), a catalyst system, diluents, any inert components, and the like. As described in more detail below, the polymerization reactor may comprise one or more types of reactors such as loop slurry reactors, gas phase reactors, autoclave reactors, tubular reactors, and the like. The polymerization reactor 101 may comprise any vessel or combination of vessels suitably configured to provide an environment for a chemical reaction (e.g., a contact zone) between monomers (e.g., ethylene) and/or polymers (e.g., an "active" or growing polymer chain), and optionally comonomers (e.g., 1-butene, 1-hexene) and/or copolymers, in the presence of a catalyst to yield a polymer (e.g., a polyethylene polymer) and/or copolymer. Further, the separation system 103 may comprise any type of device capable of separating the polymer particulate and/or one or more additional components from the resulting reaction mixture.

As used herein, the terms "polymerization reactor" or "reactor" may include at least one loop slurry polymerization reactor, gas phase reactor, autoclave reactor, or tubular reactor capable of polymerizing olefin monomers or comonomers to produce homopolymers or copolymers in a particulate form. Such homopolymers and copolymers may be referred to as resins or polymers.

The terms "contact" or "contacting" as used herein refers to the process of bringing into contact at least two distinct species such that they can react. It will be appreciated, however, that the resulting reaction product can be produced directly from a reaction between the added reagents and/or from an intermediate from one or more of the added reagents which can be produced in the reaction mixture.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range.

The polymerization processes performed in the reactor(s) (e.g., reactor 101) may include batch or continuous processes. Continuous processes could use intermittent or continuous product discharge. Processes may also include partial or full direct recycle of unreacted monomer, unreacted comonomer, and/or diluent.

Figure 2:
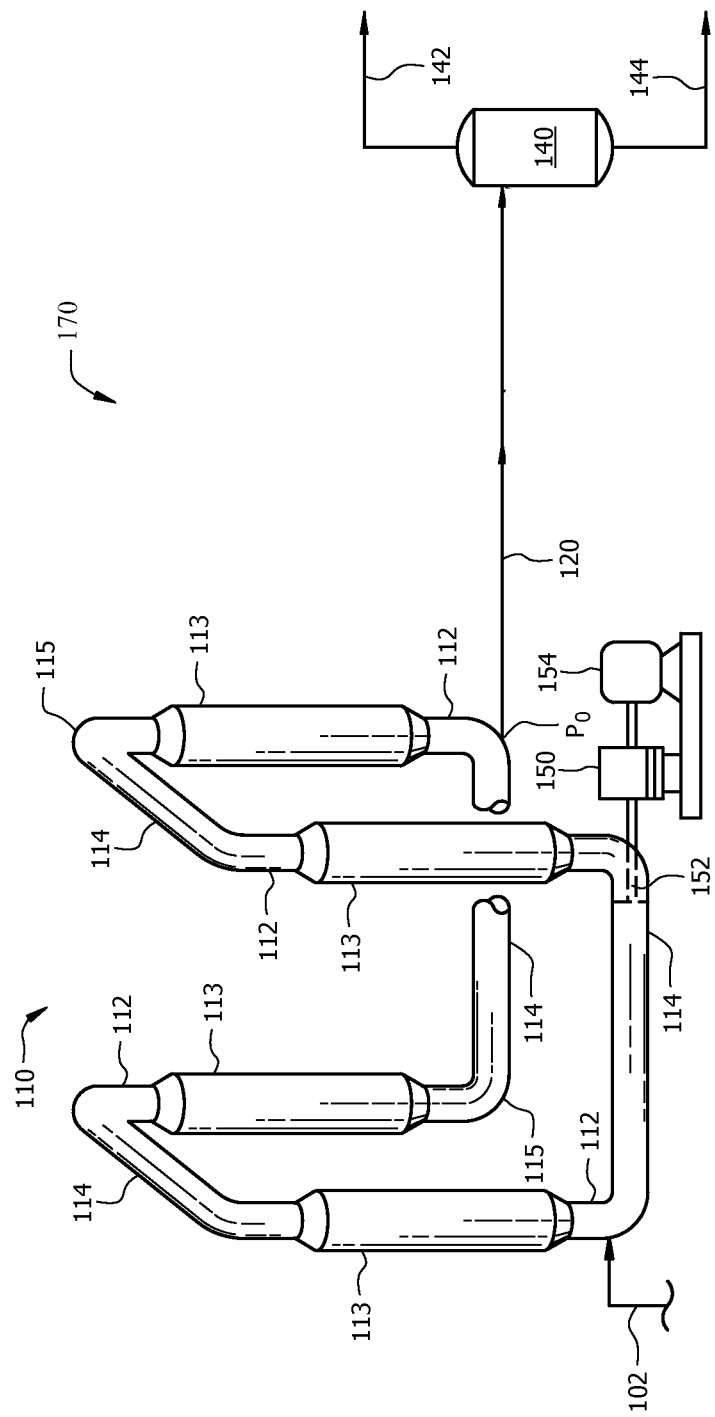
FIG. 2 schematically illustrates a process flow diagram of an embodiment of a loop polymerization process.

FIG. 2 illustrates a schematic process flow diagram of an embodiment of a polymerization system 170. The system 170 may comprise a loop slurry polymerization reactor 110 which forms polymerization product, a product line 120, which receives the polymerization product (e.g., a polymerization product slurry) from the loop slurry polymerization reactor 110, and a separation vessel 140, which receives the polymerization product (e.g., as the polymerization product slurry) from the product line 120. Solid polymer may be recovered from the separation vessel 140. The loop slurry polymerization reactor 110 may comprise an embodiment of a polymerization reactor (e.g., polymerization reactor 101 of FIG. 1), and the separation vessel 140 may comprise an embodiment of a separation system (e.g., separation system 103 of FIG. 1). Although the embodiment illustrated in FIG. 2 shows a single reactor 110, one of skill in the art viewing this disclosure will recognize that any suitable number and/or configuration of reactors may be employed, as described in more detail herein.

As shown in FIG. 2, the loop slurry polymerization reactor 110 may comprise vertical pipes 112 and/or horizontal pipes 114 interconnected by smooth bends or elbows 115, which together form a loop. Portions of the loop slurry polymerization reactor 110, such as pipes 112, may have cooling jackets 113 placed therearound to remove excess heat generated by the exothermic polymerization reactions. A cooling fluid may be circulated through an annulus between the jackets 113 and the outer surface of the reactor 110, for example. The circulation of the cooling fluid may remove heat from the loop slurry polymerization reactor 110 through the reactor wall. The cooling fluid may be circulated to a cooling system to discharge the heat before returning to the annular region in a cooling cycle. The cooling jacket(s) 113 may only cover a portion of the loop slurry polymerization reactor 110 and the intermediate regions may not be subject to heat transfer (e.g., heat removal). In an embodiment, at least about 10%, at least about 20%, at least about 30%, at least about 40%, at least about 50%, or at least about 60% of the outer surface of the loop slurry polymerization reactor 110 may be subject to heat exchange.

A motive device, such as pump 150, may circulate the fluid slurry in the loop slurry polymerization reactor 110. An example of the pump 150 is an in-line axial flow pump with a pump impeller 152 disposed within the interior of the reactor 110. The impeller 152 may, during operation, create a turbulent mixing zone within a fluid medium circulating through the reactor 110 such that sufficient contact between different polymerization components within the slurry may occur. The impeller 152 may also assist in propelling the slurry through the closed loop of the reactor 110 at sufficient speed to keep solid particulates, such as the catalyst or polymerization product, suspended within the slurry. The impeller 152 may be driven by a motor 154 or other motive force.

The system 170 may additionally comprise any equipment associated with a polymerization reactor, including but not limited to pumps, control devices (e.g., PID controllers), measurement instruments (e.g., thermocouples, transducers, and flow meters), and alternative inlet and outlet lines, as well as combinations thereof.

Monomer, diluent, catalyst, and optionally any comonomer, which may be fed to the polymerization reactor 110 (e.g., via feed stream 102), may circulate through the loop as polymerization occurs. Generally, continuous processes may comprise the continuous introduction of a monomer, an optional comonomer, a catalyst, and a diluent into the loop slurry polymerization reactor 110 and the continuous removal (e.g., via product line 120) of a slurry comprising solid polymer (e.g., polyethylene) and a liquid phase of the diluent.

In one or more embodiments, a comonomer may comprise unsaturated hydrocarbons having 3 to 20 carbon atoms. For example, a comonomer may comprise alpha olefins, such as for example propene, propylene, 1-butene, 1-pentene, 1-hexene, 3-methyl-1-butene, 4-methyl-1-pentene, 1-heptene, 1-octene, 1-nonene, 1-decene, and the like, or combinations thereof.

In embodiments, suitable diluents used in slurry polymerization processes may include, but are not limited to, the monomer, and optionally, the comonomer, being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. In embodiments, diluents may comprise unsaturated hydrocarbons having 3 to 12 carbon atoms. Further examples of suitable diluents include, but are not limited to propene, 1-butene, 1-hexene, octenes such as 1-octene, decenes such as 1-decene, or combinations thereof. Some loop polymerization reactions can occur under bulk conditions where no diluent is used. An example is the polymerization of propylene monomer as disclosed in U.S. Pat. No. 5,455,314, which is incorporated by reference herein in its entirety.

Additional information for typical loop polymerization processes is disclosed, for example, in U.S. Pat. Nos. 3,248,179, 4,501,885, 5,565,175, 5,575,979, 6,239,235, 6,262,191 and 8,883,940, each of which is incorporated by reference in its entirety herein.

In an embodiment, the system 170 may also comprise, or further comprise, a gas-phase reactor. Gas-phase reactors may comprise fluidized bed reactors or staged horizontal reactors. Gas-phase reactors may employ a continuous recycle stream containing one or more monomers continuously cycled through a fluidized bed in the presence of the catalyst under polymerization conditions. An inert gas such as nitrogen may be introduced with the reactants as a diluent to maintain the reaction in the gas phase. A recycle stream may be withdrawn from the fluidized bed and recycled back into the reactor. Simultaneously, polymer product may be withdrawn from the reactor and new or fresh monomer may be added to replace the polymerized monomer. Likewise, copolymer product may optionally be withdrawn from the reactor and new or fresh comonomer may be added to replace polymerized comonomer, polymerized monomer, or combinations thereof. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790 and 5,436,304, each of which is incorporated by reference in its entirety herein.

Figure 3:
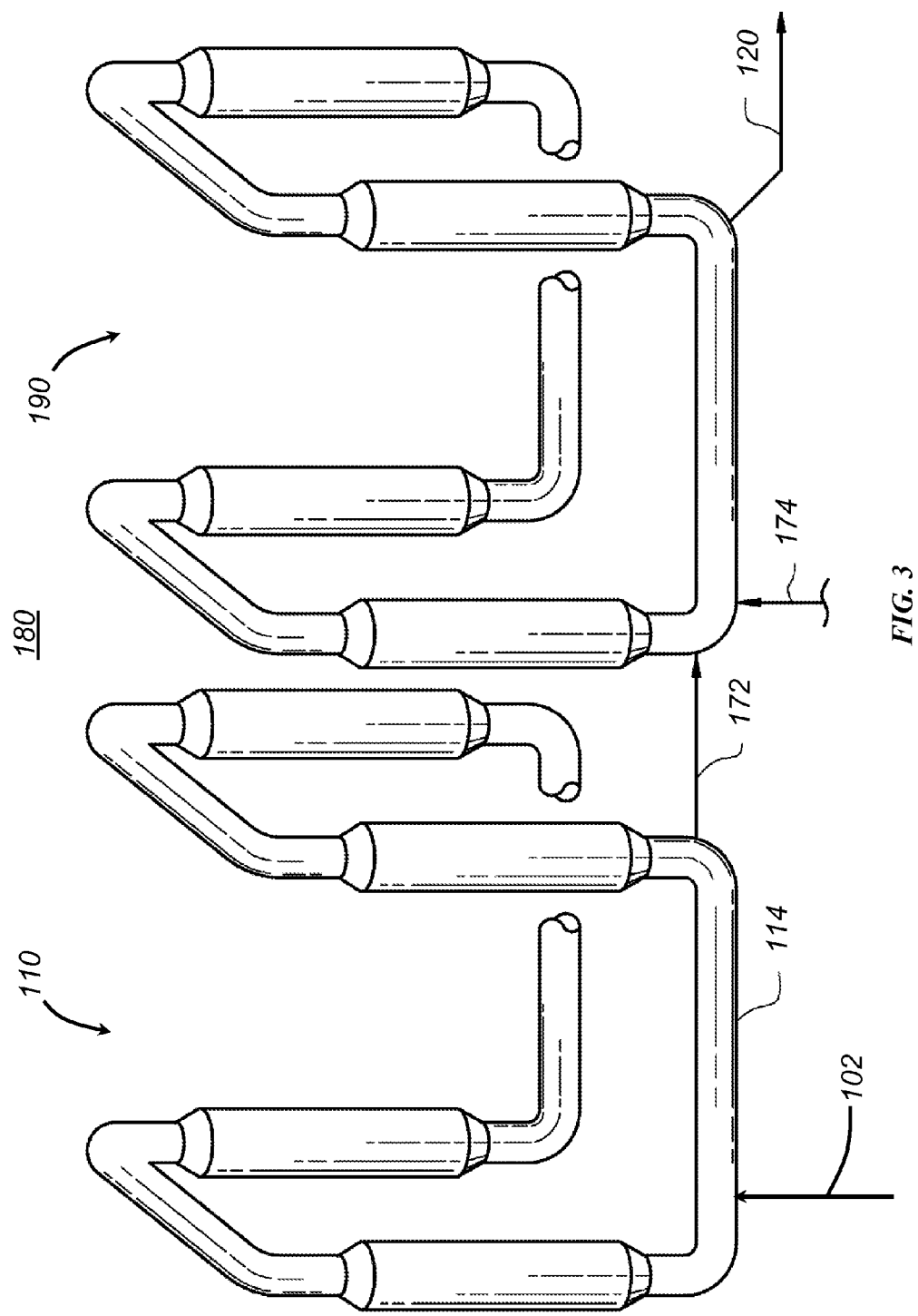
FIG. 3 schematically illustrates a process flow diagram of another embodiment of a loop polymerization process.

In an embodiment as illustrated in FIG. 3, a plurality of reactors may be present in the polymerization reaction system 180. In embodiments having multiple reactors, production of polymerization product in multiple reactors 110, 190 may include several stages in at least two separate polymerization reactors 110, 190 interconnected by a transfer device or line 172 making it possible to transfer the polymerization product resulting from a first polymerization reactor 110 into a second reactor 190. The desired polymerization conditions in one reactor may be different from the polymerization conditions of the other reactor(s). Alternatively, polymerization in multiple reactors may include the manual transfer of polymerization product (e.g., in a polymerization product slurry, as a mixture, as solid polymer, or combinations thereof) from one reactor to subsequent reactors for continued polymerization. In addition to transferring some portion of the polymerization product to the second reactor 190, one or more components of the feed (e.g., diluent, catalyst, monomers, comonomers, and the like) may be feed through an inlet line as feed stream 174 into the second reactor 190. While illustrated in FIG. 3 as multiple loop slurry polymerization reactors, multiple reactor systems may include any combination including, but not limited to, multiple loop reactors, multiple gas phase reactors, a combination of loop and gas reactors, and a combination of high pressure reactors with loop and/or gas reactors. When multiple reactors are present, at least one reactor may produce a polymerization product. The multiple reactors may be operated in series, in parallel, or in combinations thereof.

In embodiments having multiple reactors, various types of reactors that may be included in system 180 may comprise loop slurry polymerization reactors and gas-phase reactors including any of the reactors described above. Loop slurry polymerization reactors may have a loop configuration, such as the configuration of the loop slurry polymerization reactor 110 of FIG. 2. Gas-phase reactors may comprise fluidized bed reactors or staged horizontal reactors, such as the configurations described herein.

In embodiments having multiple reactors, various types of reactors that may additionally be included in system 180 may comprise high pressure reactors. High pressure reactors may comprise autoclave or tubular reactors. Tubular reactors may have several zones where fresh monomer (optionally, comonomer), initiators, or catalysts may be added. Monomer (optionally, comonomer) may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

Similarly, autoclave reactors can comprises a reactor provided with a mixing device and a feed manifold having branched-off lines, each equipped with a regulating valve. A typical autoclave reactor, may be subdivided into a plurality of reaction zones (e.g. three reaction zones: a top zone, a middle zone, and a bottom zone). The pressure within each zone of the reactor is maintained through the use of the manifold, the regulating valves, and an outlet valve. Fresh monomer (optionally, comonomer), initiators, or catalysts may be added to each zone within controlled conditions of temperature and pressure to provide the desired reaction rate.

In embodiments having multiple reactors, various types of reactors that may additionally be included in system 180 may comprise a solution polymerization reactor wherein the monomer (optionally, comonomer) may be contacted with the catalyst composition by suitable stirring or other means. A carrier comprising an inert organic diluent or excess monomer (optionally, comonomer) may be employed. If desired, the monomer and/or optional comonomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means may be utilized for dissipating the exothermic heat of polymerization.

With continued reference to systems 170 and 180 in FIGS. 1 and 2, conditions of a polymerization reactor (e.g., a loop slurry polymerization reactor 110 and/or a gas-phase reactor), which may be chosen and even controlled for polymerization efficiency and to provide selected resin properties include temperature, pressure, and the concentrations of various reactants. For example, polymerization temperature can affect catalyst productivity, polymer molecular weight, and molecular weight distribution. Suitable polymerization temperature may be any temperature below the de-polymerization temperature according to the Gibbs Free energy equation. Typically this includes temperatures from about 60° C. (140° F.) to about 280° C. (536° F.), for example, and from about 70° C. (158° F.) to about 110° C. (230° F.), depending upon the type of polymerization reactor.

Suitable pressures will also vary according to the reactor and polymerization type. The pressure for liquid phase polymerizations in a loop reactor such as loop slurry polymerization reactor 110 is typically less than about 1,000 psig, for example, about 650 psig. Pressure for gas phase polymerization can range from about 200 psig to about 500 psig. High pressure polymerization in tubular or autoclave reactors is generally run at pressures ranging from about 20,000 psig to about 75,000 psig. Polymerization reactors can also be operated in a supercritical region occurring at generally higher temperatures and pressures. Operation above the critical point of a pressure/temperature diagram (supercritical phase) may offer advantages. In an embodiment, polymerization may occur in an environment having a suitable combination of temperature and pressure. For example, polymerization may occur at a pressure in a range of about 400 psig to about 1,000 psig; alternatively, about 550 psig to about 650 psig, alternatively, about 600 psig to about 625 psig; and at a temperature in a range of about 65° C. (150° F.) to about 110° C. (230° F.), alternatively, from about 90° C. (195° F.) to about 104° C. (220° F.). For example, polymerization may occur in a loop reactor at a pressure ranging from about 400 psig to about 1,000 psig and at a temperature ranging from about 65° C. (150° F.) to about 110° C. (230° F.).

The concentration of various reactants can be controlled to produce solid polymer with certain physical and/or mechanical properties. The proposed end-use product that will be formed by the solid polymer and the method of forming that product determines the desired properties. Mechanical properties include tensile strength, flexural modulus, impact strength, tear and/or puncture resistance, crack propagation resistance, creep, stress relaxation and hardness. Physical properties include density, molecular weight (both number average molecular weight, $M_n$, and weight average molecular weight, $M_w$), molecular weight distribution (MWD, $M_w/M_n$), melting temperature, melt viscosity, glass transition temperature ($T_g$), temperature melt of crystallization, density, stereoregularity, crack growth, long chain branching and rheological measurements.

The concentrations and/or partial pressures of monomer, comonomer, hydrogen, co-catalyst, modifiers, and electron donors are important in producing these resin properties. Comonomer may be used to control product density. Hydrogen may be used to control product molecular weight. Cocatalysts can be used to alkylate, scavenge poisons and control molecular weight. Activator-support can be used to activate and support the catalyst. Modifiers can be used to control end product polymer properties, and electron donors can affect stereoregularity, the molecular weight distribution, or molecular weight. In addition, it is desirable to minimize the concentration of poisons because poisons impact the reactions and product properties, often in a negative manner.

Components of the reaction mixture within the reactor(s) disclosed herein (e.g., loop slurry polymerization reactor 110) may include olefin monomers (e.g., ethylene) and comonomers (e.g., 1-hexene), diluent (e.g., isobutane, hexane, propane, or combinations thereof), molecular weight control agents (e.g., hydrogen), and any other desired co-reactants or additives. The reaction mixture may additionally include a catalyst, and optionally, a co-catalyst. Suitable catalysts for polymerizing the monomers and any comonomers may include, but are not limited to, a catalyst(s) and, optionally, a co-catalyst(s) and/or a promoter(s). Nonlimiting examples of suitable catalyst systems include Ziegler Natta catalysts, Ziegler catalysts, chromium catalysts, chromium oxide catalysts, chromocene catalysts, metallocene catalysts, nickel catalysts, or combinations thereof. Nonlimiting examples of co-catalyst include triethylboron (TEB), methyl aluminoxane (MAO), alkyls such as triethylaluminum, or combinations thereof. Suitable activator-supports may comprise solid that can exhibit Lewis acidic or Bronsted acidic behavior, such as those described in U.S. Pat. No. 8,703,886, which is incorporated herein in by reference in its entirety. Catalyst systems suitable for use in this disclosure have been described, for example, in U.S. Pat. No. 7,619,047, U.S. Pat. No. 7,332,543, U.S. Pat. No. 7,790,820, U.S. Pat. No. 7,163,906, and U.S. Pat. No. 7,960,487, each of which is incorporated in relevant part by reference herein.

The reaction mixture may be introduced to an interior of the reactor via inlets or conduits at specified locations, such as feed line 102. Any combination of the reaction mixture identified above (and others known to those skilled in the art), including any catalyst and/or co-catalyst described herein, may form a suspension, (e.g., a slurry in a loop slurry polymerization reactor or a fluidized mixture in a gas-phase reactor), that circulates through the reactor during the polymerization process. For example, the slurry in a loop slurry polymerization reactor may circulate through the loop formed by the loop slurry polymerization reactor 110 during the polymerization process. The slurry may circulate through the reactor, and monomers (and optionally, comonomers) may polymerize to form a polymerization product. The polymerization product may comprise a polymerization product slurry, a reaction mixture, or combinations thereof.

In embodiments, the reaction mixture includes the polymerization product comprising a solid polymer and a liquid or gas phase. In an embodiment, the reaction mixture may comprise unreacted monomer, any unreacted comonomer, catalyst, and/or diluent. In additional or alternative embodiments, the reaction mixture may generally comprise various solids, semi-solids, volatile and nonvolatile liquids, or combinations thereof. In an embodiment, the reaction mixture may comprise one or more of hydrogen, nitrogen, methane, ethylene, ethane, propylene, propane, 1-butene, butane, isobutane, pentane, isopentane, hexane, 1-hexene and heavier hydrocarbons. In an embodiment, ethylene may be present in a range of from about 0.1% to about 15%, alternatively, from about 1.5% to about 5%, alternatively, about 2% to about 4% by total weight of the liquid in the product line. Ethane may be present in a range of from about 0.001% to about 4%, alternatively, from about 0.2% to about 0.5% by total weight of the material in the product line. Isobutane may be present in a range from about 80% to about 98%, alternatively, from about 92% to about 96%, alternatively, about 95% by total weight of the material in the product line.

In embodiments, the reaction mixture may comprise the solid polymer and a gas phase of at least a portion of the diluent. In additional or alternative embodiments, the mixture may comprise unreacted, gaseous monomers or optional comonomers (e.g., unreacted ethylene monomers, unreacted 1-butene monomers), gaseous waste products, gaseous contaminants, or combinations thereof. As used herein, an "unreacted monomer," for example, ethylene, refers to a monomer that was introduced into a polymerization reactor during a polymerization reaction but was not incorporated into a polymer. As used herein, an "unreacted comonomer," for example, 1-butene, refers to a comonomer that was introduced into a polymerization reactor during a polymerization reaction but was not incorporated into a polymer. Such gaseous phase reaction mixtures may be present when gas phase reactors are used in place of or in addition to a loop slurry reactor.

In embodiments, the solid polymer product may comprise a homopolymer, a copolymer, or combinations thereof. The homopolymer and/or the polymers of the copolymer may comprise a multimodal (e.g., a bimodal) polymer (e.g., polyethylene). For example, the solid polymer may comprise both a relatively high molecular weight, low density (HMWLD) polyethylene polymer component and a relatively low molecular weight, high density (LMWHD) polyethylene polymer component. Various types of suitable polymers may be characterized as having a various densities. For example, a Type I polymer may be characterized as having a density in a range of from about 0.910 g/cm$^3$ to about 0.925 g/cm$^3$; alternatively, a Type II polymer may be characterized as having a density from about 0.926 g/cm$^3$ to about 0.940 g/cm$^3$; alternatively, a Type III polymer may be characterized as having a density from about 0.941 g/cm$^3$ to about 0.959 g/cm$^3$; and, alternatively, a Type IV polymer may be characterized as having a density of greater than about 0.960 g/cm$^3$. The solid polymer may comprise other polyolefin polymers.

Referring back to FIG. 2, the polymerization product (e.g., polymerization product slurry) may be withdrawn from one or more reactors present in system 170, e.g., the loop slurry polymerization reactor 110, via product line 120. The withdrawn polymerization product may be conveyed through the product line 120 to a separation vessel 140. In an embodiment, a polymerization product in the reaction mixture may convert to an at least partial gas phase mixture in the product line 120. Thus, in select embodiments, the polymerization product conveyed through product line 120 may be in the form of a liquid polymerization product slurry (e.g., a slurry of solid polymer and liquid phase diluent and/or unreacted monomer/comonomer), a gas phase mixture (e.g., solid polymer and gas phase diluent and/or unreacted monomer/comonomer), or combinations thereof (e.g., a three-phase mixture of liquid and gaseous diluent and/or unreacted monomer/comonomer and solid polymer), and the form of the polymerization product may be a function of the conditions (e.g., temperature and pressure) present at a given location in product line 120.

In an embodiment, polymer product withdrawn from the loop slurry polymerization reactor 110 may be conveyed through the product line 120 via the total pressure differential between the operating pressure of the loop slurry polymerization reactor 110 and the separation vessel 140. In an embodiment, the polymerization product (e.g., polymerization product slurry, reaction mixture, or combinations thereof) may be conveyed through the product line 120 to yield an at least partial gas phase mixture (e.g., mixture of gas phase diluent and/or unreacted monomer/comonomer and solid polymer). In an embodiment, one or more valves (not shown) may be present in the product line 120. The position of the separation vessel 140 relative to the loop slurry polymerization reactor 110 may be adjusted in order to transfer withdrawn polymer product via the total pressure differential, for example, to minimize or reduce the equipment dedicated to polymer product conveyance, to volatilize all liquid in the polymer product, or combinations thereof.

The separation vessel 140 may recover solid polymer which is received from the product line 120. In one or more of the embodiments disclosed herein, the polymerization product flowing from the product line 120 (for example, a mixture of solid polymer and at least a portion, substantially all or all of the other components, e.g., diluent and/or unreacted monomer/comonomer, are in a gas phase) may be separated into solid polymer in line 144 and one or more gases in line 142 in separation vessel 140.

Any suitable technique may be used to separate the polymerization product into solid polymer and gases. For example, the separation vessel 140 may comprise a vapor-liquid separator. Suitable embodiments of a vapor-liquid separator may include a distillation column, a flash tank, a filter, a membrane, a reactor, an absorbent, an adsorbent, a molecular sieve, a cyclone, or combinations thereof. In an embodiment, the separator comprises a flash tank. Not seeking to be bound by theory, such a flash tank may comprise a vessel configured to vaporize and/or remove low vapor pressure components from a high temperature and/or high pressure fluid.

In an embodiment, the separation vessel 140 may be configured such that polymerization product from the product line 120 may be separated into solid and liquid (e.g., a condensate) phase components in line 144 and one or more gases (e.g., vapor) phase components in line 142. The liquid or condensate may comprise solid polymer (e.g., polyethylene) and any liquid phase components such as diluent and/or unreacted monomer/comonomer, and in some embodiments line 144 is concentrated slurry in comparison to the product slurry in product line 120. The gas or vapor may comprise volatile solvents, diluent, unreacted monomers and/or optional comonomers, waste gases (e.g., secondary reaction products, such as contaminants and the like), or combinations thereof. The separations vessel 140 may be configured such that the polymerization product flowing from the product line 120 is flashed by heat, pressure reduction, or combinations thereof such that the enthalpy of the line is increased. This may be accomplished via a heater, a flashline heater, various other operations commonly known in the art, or combinations thereof. For example, a flash line heater comprising a double pipe may exchange heat by hot water or steam. Such a flashline heater may increase the temperature of the product line 120 while reducing its pressure.

In an alternative embodiment, the separation vessel 140 may be configured such that polymerization product from product line 120 may be separated into solid polymer in line 144 substantially or completely free of any liquid phase components and one or more gases in line 142. Suitable separation techniques include distilling, vaporizing, flashing, filtering, membrane screening, absorbing, adsorbing, cycloning, gravity settling, or combinations thereof, the polymerization product received in separation vessel 140 from the product line 120.

In an embodiment, the separation vessel 140 may operate at a pressure ranging from about 50 psig to about 500 psig; alternatively, from about 130 psig to about 190 psig; or, alternatively, at an operating pressure of about 135 psig.

In one or more embodiments, the gas in line 142 may comprise hydrogen, nitrogen, methane, ethylene, ethane, propylene, propane, 1-butene, butane, isobutane, pentane, hexane, 1-hexene and heavier hydrocarbons, singularly or in combination. In an embodiment, ethylene may be present in a range of from about 0.1% to about 15%, alternatively, from about 1.5% to about 5%, alternatively, about 2% to about 4% by total weight of the line. Ethane may be present in a range of from about 0.001% to about 4%, alternatively, from about 0.2% to about 0.5% by total weight of the line. Isobutane may be present in a range from about 80% to about 98%, alternatively, from about 92% to about 96%, alternatively, about 95% by total weight of the line.

The separation vessel 140 may additionally comprise any equipment associated with the separation vessel 140, such as control devices (e.g., PID controllers) and measurement instruments (e.g., thermocouples), and level control and measurement devices.

In an embodiment, the slurry may be removed from loop slurry polymerization reactor 110 by the use of a settling leg (not shown), rather than, or in combination with, one or more continuous takeoff (CTO) assemblies. The settling leg may be an alternative removal device or in addition to the product line 120. In this embodiment, a portion of the product slurry can be continuously or periodically drawn off from the reactor loop into a relatively short segment of piping in a generally vertically positioned relative to the loop horizontal line. The product slurry draw may be controlled in rate or amount by a receiver valve and into a sloped or slanted (canted) leg. Once the product slurry, and particularly the solid polymer product, is received in the settling leg, the reactor effluent can be flashed to remove the solid polymer from the liquids (e.g., the diluent, monomer, comonomer, and the like). Various technologies can be used for this separation step including but not limited to, flashing that can include any combination of heat addition and pressure reduction, separation by cyclonic action in either a cyclone or hydrocyclone, or separation by centrifugation. The solid polymer product having a portion, substantially all, or all of the liquid removed can then be passed to one or more downstream processing units.

In general, the polymerization process is exothermic, and the heat generated during the reaction can be removed from the reactor to prevent the polyolefin product from melting within the reactor. Such overheating may result in fouling, plugging, or other adverse effects within the reactor. In addition to limiting the potential adverse effects, maintaining a controlled temperature within the reactor may be important to producing a product having the desired properties. As described in more detail below, the temperature within the polymerization reactor may be controlled based on a determination of the product polymer particle temperature. For example, the polymer particle temperature may be maintained at or below a melting temperature or at or below a fouling temperature, thereby potentially limiting the adverse effects associated with operating above a fouling temperature (e.g., plugging, sheeting, and the like).

The polymer particle temperature is based on the heat released during the polymerization reaction and the heat transfer rate out of the polymer particle. While not intending to be limited by theory, the particle temperature can be determined, in an embodiment, by considering the heat generated at the active catalyst site and the transfer of the heat through the polymer particle, the bulk fluid phase, and into the reactor wall. In order to discuss these various heat transfer pathways, a schematic view of a polymer product 402 within a reactor (e.g., a loop slurry polymerization reactor and/or a gas-phase reactor) is illustrated in FIG. 4, which is exaggerated in scale for purposes of discussion.

Figure 4:
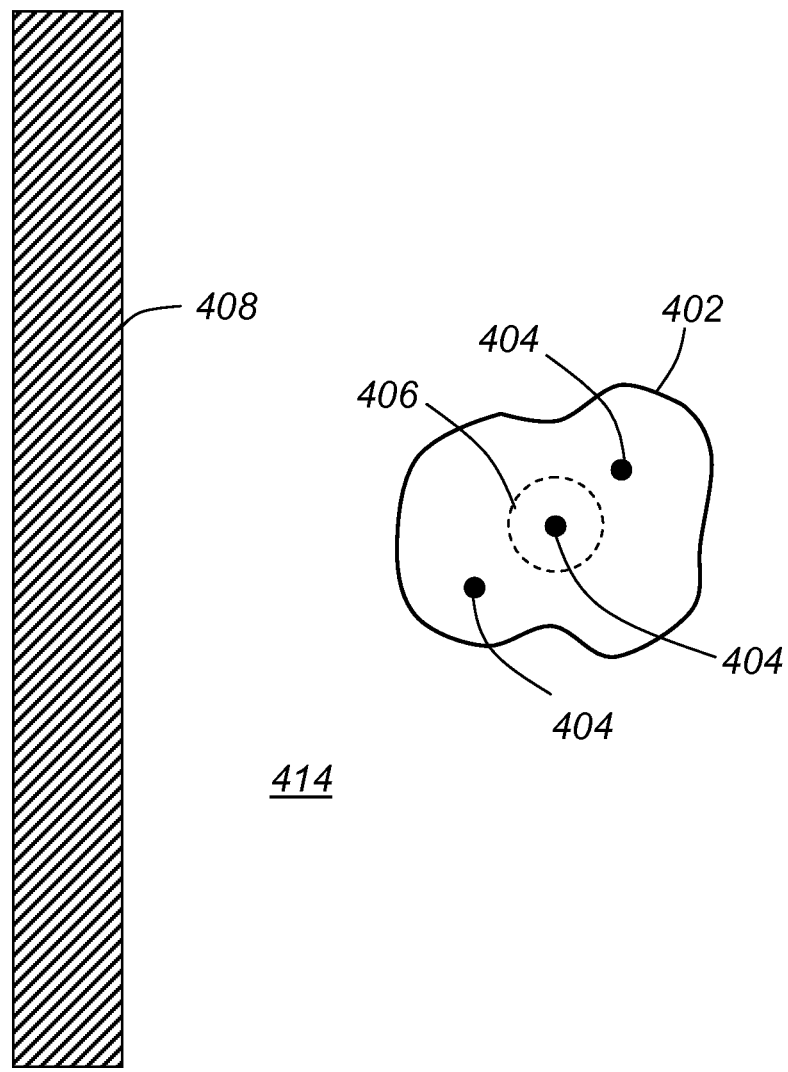
FIG. 4 schematically illustrates a partial, exaggerated cross-sectional view of a polymer particle within a polymerization reactor.

Within the reactor, the monomer and/or comonomer may contact the active catalyst sites 404 to form a polymerization product comprising a plurality of polymer particles 402, only one of which is shown in FIG. 4. While only a single polymer particle 402 is illustrated in FIG. 4 for simplicity, it should be understood that a plurality of polymer particles 402 having the same or different sizes (e.g., present in a size distribution) would be present within the polymerization reactor. Each polymer particle 402 may have one or more catalyst sites 404. As the polymerization reaction proceeds at the catalyst sites 404, the catalyst site 404 may release the heat of polymerization and increase the temperature of product polymer surrounding the catalyst site 404. The resulting temperature rise at the catalyst site 404 may result in a temperature difference between the catalyst site 404, the remainder of the polymer particle 402, and the surrounding bulk fluid phase 414, which may generally comprise the diluent, monomer, and/or comonomer in a loop slurry polymerization reactor or the gas medium (e.g., the gas phase diluent, monomer, comonomer, and the like) in a gas-phase reactor.

During the polymerization reaction, the heat of polymerization generated at the catalyst site may create a heated region near the catalyst site 404 (e.g., within the volume bounded by surface 406). A first temperature differential ($\Delta T_1$) may then be established between the temperature of the polymerization site 404, which may be referred to herein as the polymerization site temperature ($T_s$), and the temperature of the remaining portion of the polymer particle 402, which may be referred to as the particle temperature ($T_p$). The temperature differential $\Delta T_1$ may provide the driving force or drop in energy potential to transfer the heat to the rest of the polymer particle 402, for example, across the surface 406. It is expected that the main heat transfer mechanism is the conductive heat transfer of the heat generated at the polymerization site to the bulk polymer particle 402. If the particle temperature $T_p$ is high enough to melt or cause the polymer to assume an amorphous structure, the polymer at or near the catalyst site 404 may swell relative to the remainder of the polymer particle 402, which may be at a lower temperature allowing it to assume an at least partially crystalline form. The swelling may be enhanced by the absorption of the diluent or reactants in the amorphous polymer product. The composition of the bulk fluid 414 may influence the amount of swelling and the temperature at which swelling occurs since different diluents dissolve or swell a given product polymer at different temperatures.

In relation to the catalyst site 404, the remaining polymer particle 402 is relatively large and may be expected to have a surface area large enough to transfer the heat to the surrounding fluid 414 at the average reactor temperature, which is referred to herein as the bulk fluid temperature ($T_b$). The temperature of the polymer particle ($T_p$) may be low enough to allow the polymer to assume a crystalline form without being molten or swollen. The average temperature of the bulk fluid $T_b$ is expected to be lower than the particle temperature ($T_p$), thereby causing the heat to transfer from the particle 402 to the bulk fluid 414. A second temperature differential ($\Delta T_2$) may then be established between the particle temperature $T_p$ and the bulk fluid temperature $T_b$. The temperature differential $\Delta T_2$ may provide the driving force or drop in energy potential to transfer the heat from the polymer particle 402 to the bulk fluid 414, for example, across the outer surface of the polymer particle 402.

In an embodiment, the heat transfer from the polymer particle 402 to the bulk fluid 414 is generally controlled by the convective transfer of the heat from the polymer particle 402 to the bulk fluid 414 surrounding the polymer particle 402. When the polymer particle 402 is suspended within the bulk fluid 414, the bulk fluid 414 may form a laminar boundary layer or film around the polymer particle 402. The surface of the polymer particle 402 may be at a higher temperature than the surrounding fluid 414, which may provide the driving force to conduct the heat through the film to the bulk fluid 414 where convection then disperses the heat through the bulk fluid 414 and ultimately to the reactor wall 408. The polymer particles 402 are generally suspended in the bulk fluid 414, which may be likened to the travel of a hot air balloon in the air. The polymer particle 402 flows with the bulk fluid current and may have a low relative velocity with the surrounding bulk fluid 414 (e.g., the diluent or gas-phase). The relative velocity of the polymer particle 402 relative to the bulk fluid 414 is based on the terminal velocity (e.g., the settling velocity) through the bulk fluid 414 plus any bulk turbulence (e.g., velocity fluctuations) that the fluid has at its bulk flowrate. In general, the velocity fluctuations are less than the bulk flow and have an order of magnitude of about 5% to about 10% of the average flowrate of the bulk fluid 414. The velocity fluctuations may also be called the turbulence intensity. The low relative velocity between the polymer particle 402 and the bulk fluid 414 creates a relatively large film layer round the polymer particle 402, thereby increasing the resistance to heat transfer from the polymer particle 402 to the bulk fluid 414.

The resulting heat transfer from the polymer particles 402 to the bulk fluid 414 may cause the temperature of the bulk fluid 414 to be greater than the temperature of the reactor wall 414, which may be referred to as the wall temperature ($T_w$). The reactor wall 408 may be cooled using a cooling fluid in contact with a portion of the external surface of the reactor, such as with cooling jackets 113 (FIG. 2). Due to the resistances to heat transfer between the cooling fluid and the external surface of the reactor wall as well as the internal heat transfer resistance present within the reactor wall 408, the wall temperature $T_w$ may be greater than the cooling fluid temperature but less than the temperature of the bulk fluid 414. A third temperature differential ($\Delta T_3$) may be established between the bulk fluid 414 at temperature $T_b$ and the reactor wall at temperature $T_w$. The temperature differential $\Delta T_3$ may provide the driving force or drop in energy potential to transfer the heat from the bulk fluid 414 to the reactor wall 408. As with the polymer particle, a slurry film or boundary layer may form between the reactor wall and the bulk fluid 414 flow. Various factors including the bulk fluid viscosity and flowrate may affect the resistance to heat transfer through the slurry film layer. The fluid viscosity may be affected by the solids content and/or solids density, which may in turn be affected by the temperature of the particle and polymerization site.

In an embodiment, the polymer particle 402 may be in a solid state with the bulk of the polymer product in a crystalline form when the temperature of the polymer particle 402 is well below the melting point of the polymer particle 402. The melting temperature as used herein refers to the melting temperature determined by differential scanning calorimetry ("DSC") as is known in the art, where the melting temperature is the differential scanning calorimetry (DSC) peak melt temperature as determined by ISO Test No. 11357. The polymer product has a temperature range over which the polymer becomes an amorphous liquid. In general, melting or softening may begin at a temperature less than the melting temperature. As used herein, the "fouling temperature" is the temperature at which the polymer starts to soften, melt, and loose crystallinity in the diluent in the reaction mixture. In the context of a gas-phase reactor, the fouling temperature may sometimes be referred to as the "sticking-sheeting temperature," though the use of the term fouling temperature herein may be used with both loop slurry polymerization reactors and gas-phase reactors. The fouling temperature provides a measure of the point at which the polymer particles may begin to adhere to the interior surface of the reactor and potentially display plugging or sheeting behavior within the reactor. In an embodiment, the fouling temperature may be defined as the temperature at about 10% of the DSC heat inflow for the polymer product. In an embodiment, at least the outer portion of the polymer particle 402 may be maintained below the fouling temperature during the polymerization process in order to avoid the adverse effects associated with the polymer product fouling the reactor.

For some polymerization reactions, the heat of polymerization can be significantly greater (e.g., approximately an order of magnitude greater) than the energy needed to melt the polymer product. As a result, the polymer product formed at the catalyst site 404 may be molten at or near the time it is created, creating a molten or near molten region near the catalyst site 404 (e.g., within surface 406). Beyond the molten region, the temperature may still be elevated above the fouling temperature since the fouling temperature is less than the melting temperature of the polymer product. The remainder of the polymer particle 402, which may comprise the majority of the particle, may be maintained at a temperature that is below the fouling temperature in the reactor by controlling various operating parameters within the reactor.

In order to understand the relationship between the temperature of the polymer particle 402 and the parameters within the polymerization reactor, various effects associated with an elevated temperature of the particle ($T_p$) can be considered. In general, the reaction rate at the catalyst site 404 is expected to increase as the ethylene concentration increases within the reactor fluid phase 414 and/or as the activity of the catalyst site 404 increases. When a reactor operates with high ethylene concentrations and high catalyst site activity, the region surrounding the catalyst site 404 may be experience a temperature above the swelling, fouling, and/or melting temperature. The increased temperature at or near the catalyst site may lead to an elevated temperature of the polymer particle 402. In an embodiment, an elevated temperature of the polymer particle, $T_p$, may result in the swelling of the polymer particle volume along with the associated decrease in density, an increase in the apparent viscosity of the slurry within the reactor, and/or a decrease in the heat transfer coefficient from the polymer particle 402 to the bulk fluid 414. Each of these effects is described in more detail herein.

An increased temperature ($T_p$) of the polymer particle 402 may lead to polymer swelling. If the heat released during the polymerization reaction is sufficient to create a molten polymer at or near the catalyst site 404, the polymer may assume an amorphous form. The amorphous form may be less dense than a crystalline form of the polymer product and may also allow diluent to absorb within the amorphous polymer product, leading to a further decrease in the density. The swollen and increased amorphous region of the polymer particle 402 may occupy more reactor volume at the same weight fraction of the solids, which increases the relative or apparent viscosity in the reactor. The higher viscosity may decrease heat transfer from the bulk fluid 414 to the reactor wall due to an increased resistance to heat transfer across the film layer between the bulk fluid 414 and the reactor wall 408. The temperature difference $\Delta T_3$ between the bulk fluid 414 and the reactor wall 408 may increase as a result of the increased resistance to heat transfer. The change in apparent viscosity may also affect the reactor circulation rate, the pump pressure change, and the pump power requirements. Specifically, as the apparent viscosity increases, the reactor circulation rate may decrease, the pump pressure change may decrease, and/or the pump power requirements may increase.

An increased temperature of the polymer particle 402 may lead to a decrease in the heat transfer coefficient from the polymer particle 402 to the bulk fluid 414. The bulk fluid generally comprises a diluent (e.g., isobutane) and one or more additional components (e.g., unreacted monomer, comonomer, additional reactants such as hydrogen, and the like) that may be volatile at elevated temperatures. As the temperature differential $\Delta T_2$ increases, a local gas region such as a diluent gas phase or bubble may form on the surface of the polymer particle 402. The resulting gas phase results in a decreased heat transfer coefficient between the polymer particle 402 and the bulk fluid 414 due to the thermal conduction properties of a gas being approximately an order of magnitude lower than for liquid. The resulting lower heat transfer coefficient may then cause the particle to heat up (e.g., an increased $\Delta T_2$) and increase the portion of the polymer particle volume that is molten and not crystalline. As described above, the increase in the particle temperature lowers the particles density, causes the polymer particle to swell, increases the apparent viscosity of the slurry, and/or reduces the turbulence in the reactor. The local gas phase may also reduce the settling velocity of the particles, further increasing the resistance to heat transfer across the film layer around the polymer particle. Each of these effects may reduce the heat transfer from the polymer particle 402 to bulk fluid 414 through the fluid film around the polymer particle 402 and cause the polymer particle to experience a further temperature increase.

For gas-phase polymerization reactions, the composition of the bulk fluid phase (e.g., the gas phase) may not have as strong of an effect on the polymer particle 402 temperature as the diluent in the loop slurry polymerization reactions. Rather, the ethylene concentration may control the rate of polymerization and thus heat formation within the particle. The use of a gas-phase reaction may also affect the second temperature differential due to the coefficient of heat transfer from the polymer particle 402 to the bulk fluid 414 being lower for a gas phase bulk fluid than for a liquid phase bulk fluid.

These considerations may be used to select one or more polymerization operating conditions within a polymerization reactor. In an embodiment, a foul curve may be generated that takes into account the specifics of the reaction, reaction products, and reactor design to provide guidance on the safe operating temperatures and conditions for the reactor. As used herein, a "foul curve" relates the properties of a polymer particle (e.g., the polymer particle size, composition, and the like) and the reactor conditions to the fouling temperature of the polymer particles within the reactor. As the reaction progresses, the fouling temperature provided by the foul curve may change, which may provide a dynamic operating temperature guideline or set point. In an embodiment, the determination of the operating conditions within a polymerization reactor may relate the temperature of the polymer particle to the heat transfer of the heat of polymerization within the reactor (e.g., through the polymer particle, bulk fluid, and the reactor wall), the activity of the polymerization site, and the size of the polymer particle, each of which may change during the polymerization reaction. The operating conditions may then be controlled or modified to maintain the particle temperature at or below the fouling temperature during the polymerization reaction. In some embodiments, the foul curve may be generated for a second reactor based on data obtained from the polymerization reactor. Specifics such as a reactor type, a reactor temperature, a reactor pressure, a reactor continuous phase, a catalyst composition, the rheological properties within the reactor, a diluent type and composition, the catalyst kinetics, the catalyst site concentration, a prepolymerization amount, or any combination thereof can be used to determine the foul curve.

In an embodiment, the determination of the operating conditions may begin with a consideration of the temperature of the polymer particle and the heat transfer pathway from the polymer particle to the reactor wall. Any suitable calculation method or process may be used to determine the polymer particle temperature $T_p$.

In an embodiment, the polymer particle temperature may be determined by modeling a polymer particle of the plurality of polymer particles present in the polymerization reactor as a sphere and assuming the polymerization site is in the center of the sphere. It is further assumed that the heat generated is generated within about half the mass of the particle. Under these assumptions, the heat of polymerization is removed through one half of the mass of the polymer particle. Using the bulk fluid temperature, the temperature of the particle ($T_p$) and/or the polymerization site ($T_s$) can be determined.

In an embodiment, the temperature of the particle $T_p$ can be determined using the following approximation:

$$T_p = T_b + \frac{Q_p}{h_s * A_p} \qquad \text{(Eq. 1)}$$

In Eq. 1, $Q_p$ is the heat released within the particle (e.g., the heat of polymerization) in units of BTU/lb-hr (e.g., which can be expressed as $(BTU)(ft^{-1})(hr^{-1})$), $h_s$ is the slurry film coefficient in units of $(BTU)(hr^{-1})(ft^{-2})(°F.^{-1})$, $A_p$ is the surface area of the particle in units of $(ft^2)$, and $T_b$ is the bulk fluid temperature in units of °F. The slurry film coefficient can be determined using any known methods or approximations. In an embodiment, the slurry film coefficient may be determined based on the following approximation;

$$h_s = \frac{k_l}{D_p} * \left(2 + 0.6 * \sqrt{Re} * \sqrt[3]{Pr}\right) \quad \text{(Eq. 2)}$$

In Eq. 2, $k_l$ is the thermal conductivity of the bulk fluid in units of $(BTU)(hr^{-1})(ft^{-1})(°F.^{-1})$, $D_p$ is the diameter of the particle in units of ft, Re is the Reynolds number of the particle, and Pr is the Prandtl number of the particle, where the Reynolds number and the Prandtl number are dimensionless. One of ordinary skill in the art, with the aid of this disclosure, may determine the Prandtl number and the Reynolds number for a given geometry. For example, the Reynolds number of the slurry ($Re_s$) is the ratio of the inertial forces to the viscous forces in the slurry. In an embodiment, the Reynolds number of the slurry can be represented by the equation:

$$Re_s = \frac{D_i \cdot V_s \cdot \rho_s}{\mu_s} \quad \text{(Eq. 3)}$$

where $V_s$ is the velocity of the slurry in $(ft)(s^{-1})$, $\rho_s$ is the slurry density in $(lb)(ft^{-3})$, $D_i$ is the inner diameter of the reactor wall in units of (ft), and $\mu_s$ is the slurry viscosity in $(lb)(ft^{-1})(s^{-1})$. The Prandtl number of the slurry (Prs) is the ratio of the kinematic viscosity to the thermal diffusivity rate. In an embodiment, the Prandtl number of the slurry can be represented by the equation $$Pr_s = \frac{Cp_s \cdot \mu_s \cdot 3600}{\kappa_s} \quad \text{(Eq. 4)}$$

where $Cp_s$ is the specific heat capacity of the slurry in $(Btu)(lb^{-1})(°F.^{-1})$, $\mu_s$ is the slurry viscosity in $(lb)(ft^{-1})(s^{-1})$, $\kappa_s$ is the thermal conductivity of the slurry in units of $(Btu)(hr^{-1})(ft^{-1})(°F.^{-1})$, and the factor of 3600 is for the conversion of hours to seconds.

In an embodiment, the temperature of the polymerization site $T_s$ can be determined using the following approximation:

$$T_s = T_b + \frac{Q_p * D_p * 0.103}{k_p * \left(\frac{A_p}{16}\right)} \quad \text{(Eq. 5)}$$

In Eq. 5, $k_p$ is the thermal conductivity of the particle in units of $(BTU)(hr^{-1})(ft^{-1})(°F.^{-1})$, and the remaining factors are the same as described above. Eq. 5 assumes that the temperature of the reaction site where the heat is generated occupies one half of the volume of the polymer particle. Under this assumption, about 79.4% of the diameter of the polymer particle is within the interior volume of the polymer particle and the heat conduction from the interior volume to the outer surface of the particle passes through about 10.3% of the overall diameter of the polymer particle. Eq. 5 also provides the steady state polymerization site temperature at about one fourth of the diameter of the polymer particle.

As shown in Eqs. 1-5, various parameters within the reactor affect the temperature of the polymer particle and the polymerization site temperature during the polymerization process. In an embodiment, the temperature of the particle ($T_p$) and/or the temperature of the polymerization site ($T_s$) may be affected by the bulk fluid temperature, the reactivity of the catalyst, the concentration of the reactant(s), the diameter of the polymer particle, the polymer particle velocity relative to the bulk fluid, and/or the bulk fluid properties (e.g., the thermal conductivity, density, viscosity, specific heat, and the like). Additional parameters may in turn affect one or more of these parameters.

The polymerization reactor may be operated under various conditions to avoid the fouling of the reactor. In general, the reactor may be operated to maintain the polymer particles below the melting point of the product polymer and/or below the fouling temperature of the polymer particles. The risk of fouling the polymerization reactor may be reduced or avoided by controlling or modifying one or more operating parameters associated with the polymerization reactor. For example, one or more of the conditions affecting the polymer particle temperature may be controlled to reduce the risk of fouling. In an embodiment, the risk of fouling may be reduced or avoided by controlling the bulk fluid temperature within the polymerization reactor, controlling the reactant concentration (e.g., the olefin monomer concentration, a comonomer concentration, and the like) within the polymerization reactor, controlling the initial particle size (e.g., a catalyst particle size, a polymer particle size, and the like) within the reactor, controlling the activity of the catalyst, using a catalyst with a non-linear kinetic profile, using a catalyst that breaks apart during the polymerization reaction to control the particle size within the reactor, controlling the reaction conditions to break apart the polymer particles formed within the reactor, operating the reactor at a pressure to avoid vaporization of one or more components of the reaction mixture, or any combination thereof.

In an embodiment, the risk of fouling may be reduced by lowering the bulk fluid temperature ($T_b$). The bulk fluid temperature represents the average temperature of the continuous phase within the polymerization reactor. Lowering the bulk fluid temperature ($T_b$) can reduce the temperature of the polymer particles ($T_p$), which may maintain the particle temperatures below the fouling temperature. The reduced particle temperature ($T_p$) may also reduce any swelling of the particle, potentially reducing such effects as an increased apparent viscosity. Lowering the reactor temperature may also lower the vapor pressure/saturation pressure of the components within the reaction mixture. This may avoid the formation of a vapor phase on the surface of the polymer particle, which may lead to an insulating effect as described in more detail herein. However, lowering the bulk fluid temperature may also reduce the third temperature differential between the bulk fluid temperature ($T_b$) and the reactor wall temperature ($T_w$), which may reduce the overall heat transfer from the reactor to the cooling fluid. Further, reducing the bulk fluid temperature ($T_b$) may also lower the catalyst activity and polymer production rate. In an embodiment, risk of fouling the polymerization reactor may be controlled by controlling the bulk fluid temperature ($T_b$) to be less than or equal to an upper threshold at which the average temperature of the polymer particles is at or near the fouling temperature. In some embodiments, the risk of fouling may be controlled by controlling the bulk fluid temperature ($T_b$) to be less than or equal to a threshold at which the reaction site temperature within the polymer particles is near the melting point of the product polymer, for example, less than the melting point of the product polymer.

In an embodiment, the risk of fouling may be reduced by lowering the reactant concentration within the reaction mixture. The reaction rate is generally dependent on the reactant concentration. By lowering the reactant concentration, the reaction rate may be reduced along with the rate of heat generated within the polymer particles. As the heat generated within the polymer particle at the polymerization site is reduced, the resulting temperature differentials between the polymerization site temperature and the average particle temperature and between the average particle temperature and the bulk fluid (414) are reduced. In an embodiment, the risk of fouling may be controlled by controlling the reactant concentration to reduce the reaction rate and heat generation rate within the polymer particles. The reaction rate and heat generation rate may be controlled to be below an upper threshold at which the particle temperature ($T_p$) is at or near the fouling temperature and/or the polymerization site temperature ($T_s$) is at or near the melting point of the product polymer.

In an embodiment, the risk of fouling may be reduced through the selection of the kinetic profile of the catalyst used. In some embodiments, several catalysts may be available for a desired polymer product and/or a catalyst may be available in one of several forms, such as catalyst particles, catalyst components that react to serve as a catalyst within the reactor, and the like. Each catalyst or catalyst form may comprise a different kinetic profile. In order to control the temperature of the particle, a catalyst having a kinetic profile that has a relatively slow polymerization rate at the beginning of the reaction when the polymer particles are small and then has a higher polymerization rate once the polymer particles have grown may be used to carry out the polymerization reaction. The use of a slower polymerization rate when the polymer particles are small may allow the heat of polymerization to be removed from each polymer particle without excessive melting when the polymer particles are small while allowing for a higher polymerization rate once the polymer particles have increased in size. Various techniques include the use of a catalyst having an induction period (e.g., an activation period). The induction period results in an initially reduced polymerization rate while the catalyst is being activated, which may control the reaction rate during the initial polymer particle formation. As the polymer particles grow in size, the reactivity of the catalyst can increase or approach its full polymerization rate. In an embodiment, the risk of fouling may be controlled by controlling the kinetic profile of the catalyst(s) used for the polymerization reaction to control the reaction rate and heat generation rate within the polymer particles as the polymer particles change in size. The controlled reaction rate may allow the particle to maintain a particle temperature ($T_p$) at or near the fouling temperature during the polymerization reaction.

In an embodiment, the risk of fouling may be reduced by selecting the relative number (e.g., an average number across the plurality of polymer particles) of active polymerization sites for the catalyst particles. The reaction kinetics are dependent on the number of active polymerization sites in the catalyst particles, and the heat released within the polymer particles generally increases with an increased number of polymerization sites. By reducing or limiting the number of active polymerization sites, the reaction rate may be reduced and the heat generated within the polymer particles may be reduced. As the heat generated within the polymer particles at the polymerization sites is reduced, the resulting temperature differentials between the polymerization site temperature and the average particle temperature, and between the average particle temperature and the bulk fluid temperature may be reduced. In an embodiment, the risk of fouling may be controlled by controlling the number of active polymerization sites on the catalyst particles fed to the polymerization reactor. Controlling the number of active polymerization sites may include reducing the reaction rate and heat generation rate within the polymer particles at the polymerization site below an upper threshold at which the particle temperature is at or near the fouling temperature.

In an embodiment, the risk of fouling may be reduced by controlling the initial catalyst particle size within the polymerization reactor. In general, smaller catalyst particles have an increased ratio of the surface area of the catalyst particle to the volume of the catalyst particle. The increased ratio may provide a greater surface area per polymerization site for transferring the heat to the bulk fluid. This may allow smaller catalyst particles to have higher polymerization rates with the associated higher heat release rates than larger catalyst particles while having a polymer particle temperature that remains at or near the fouling temperature. Smaller catalyst particles may also have lower polymerization rates and generate less heat than a larger catalyst particle. This may also control the polymer particle temperatures during the polymerization process. Control of the initial particle size may allow the risk of fouling to be controlled by selecting the initial particle size to allow the polymer particles to maintain a polymer particle temperature at or near the fouling temperature.

In an embodiment, the risk of fouling may be reduced by controlling the particle size of the catalyst particles within the polymerization reactor. As noted above, smaller catalyst particles may have an increased surface area to volume ratio. While the initial size of the catalyst can be controlled, the size of the catalyst particles within the polymerization reactor may also be controlled by selecting a catalyst particle that breaks apart as it polymerizes, thereby decreasing the individual catalyst particle sizes within the polymerization reactor. The reactor may be operated under conditions configured to cause the catalyst particles to break apart. For example, the pumping characteristics may be selected to break apart the catalyst particles. This may be achieved by selecting a pump rate sufficient to cause a degree of turbulence within the reactor sufficient to break apart the catalyst particles. The impeller or pump characteristics may also be selected to physically break apart the catalyst particles as the reaction mixture passes through the pump or other motive device. Any other suitable method of reducing the catalyst particle size within the polymerization reactor may also be used. In an embodiment, control of the catalyst particle size within the polymerization reactor may allow the risk of fouling to be controlled by reducing the catalyst particle size to allow the polymer particles to maintain a particle temperature at or near the fouling temperature.

The polymer particle size within the polymerization reactor can also be controlled using a pre-polymerization reactor to initially grow the polymer particles to a suitable size before passing the polymer particles to the polymerization reactor. As the polymer particle size increases, the surface area may also increase, which may allow the polymer particles to transfer the heat of polymerization to the bulk fluid 414 without exceeding the melting and/or fouling temperature. In an embodiment, a multi-reactor system such as the system described with respect to FIG. 3 may be used to initially contact a monomer and/or comonomer with a catalyst in a pre-polymerization step in a pre-polymerization reactor (e.g., reactor 110) to form pre-polymer particles. The reaction conditions within the pre-polymerization reactor may be controlled to have a lower temperature and/or lower polymerization rate to allow the pre-polymer particles to form without excessive melting. For example, the conditions may allow the pre-polymer particles to form within the pre-polymerization reactor without exceeding the melting temperature or the fouling temperature of the pre-polymer product. Once the pre-polymer particles have been formed in the pre-polymerization reactor and reached a first average size (e.g., an average diameter), they may be passed to the main polymerization reactor (e.g., reactor 190) for continued polymerization. The pre-polymer particles may be separated prior to being passed to the main polymerization reactor and/or some portion of the reaction mixture from the pre-polymerization reactor may be passed to the main reactor. The average size of the polymer particles in the main reactor may then be larger based on the introduction of the pre-polymer particles that have already grown to the first average size in the pre-polymerization reactor. The main reactor may operate at different conditions such as a higher bulk fluid temperature, higher pressure, higher monomer and/or comonomer concentration, or the like relative to the pre-polymerization reactor. This configuration may allow the polymerization rate to be changed between the two reactors while allowing the polymer particles in the main reactor to be maintained at or near the fouling temperature.

In an embodiment, the risk of fouling may be reduced by controlling the pressure within the polymerization reactor to suppress the formation of any vapor regions on or around the polymer particles. As noted above, the polymer particle temperature may exceed the vapor pressure of one or more components of the reaction mixture and cause a vapor region to form on the polymer particle. The vapor region may cause the relative velocity of the polymer particle to be reduced relative to the bulk fluid, and the vapor region may act as an insulator on the exterior of the polymer particle. Both of these results may cause the temperature of the polymer particle to rise, which may contribute to swelling and/or fouling. The selection of the operating pressure within the polymerization reactor may be used to suppress or prevent the formation of any vapor regions at the expected polymer particle temperatures. In an embodiment, control of the operating pressure may allow the risk of fouling to be controlled by selecting the pressure to prevent the formation of any vapor regions on the polymer particles.

In some embodiments, the reactor temperature as characterized by the bulk fluid temperature ($T_b$) may be controlled by the selection of the catalyst and the desired product, where the temperature controls the product characteristics. By controlling the parameters within the reactor to maintaining the polymer particle temperatures below the melting temperature of the polymer product and/or the fouling temperature, the polymerization reactor may be operated at a desired temperature (e.g., a temperature that generates a desired product with a given catalyst(s)) to provide a desired product without fouling the reactor.

In an embodiment, the heat transfer considerations and calculations described herein may be used to select polymerization operating conditions within a polymerization reactor. The reactor may comprise a plurality of solid polymer particles formed within a bulk fluid, for example, polymer particles formed within a loop slurry polymerization reactor and/or a gas-phase reactor. One or more polymer particles may be selected or modeled in the selection of the operating conditions. The selected polymer particle or particles may represent an average of the plurality of polymer particles, or some other fraction of the polymer particles. For example, the larger polymer particles in the size distribution of particles within the polymerization reactor may be expected to have a lower fouling temperature than the smaller polymer particles. The larger polymer particles are expected to have a lower fouling temperature with respect to the temperature measured in the bulk continuous phase fluid (either gas or liquid) because the larger polymer particles have more surface area per active catalyst site. This assumes that the number of catalyst active sites is proportional to the volume of the catalyst in the polymer particle and the volume of catalyst in different sized polymer particles is constant. The relatively higher surface area per catalyst active site in the large polymer particles causes the particles to heat up to a lower temperature to allow the heat of polymerization to be transferred from the particle to the bulk continuous phase. As a result, the modeled polymer particle may represent a smaller particle diameter, where the smaller particle diameter is based on the sizes of the polymer particles present in the polymerization reactor.

In some embodiments, the selection of the operating conditions may be performed by a processor executing a control program. The control program may be stored in a memory accessible by the processor and execute on the processor to carry out various determination, calculation, communication, and/or control steps. The processor may be in signal communication with one or more devices used to control at least one aspect of the polymerization reactor. A computer comprising a memory and processor suitable for use in executing such a control program is described in more detail herein.

Figure 5:
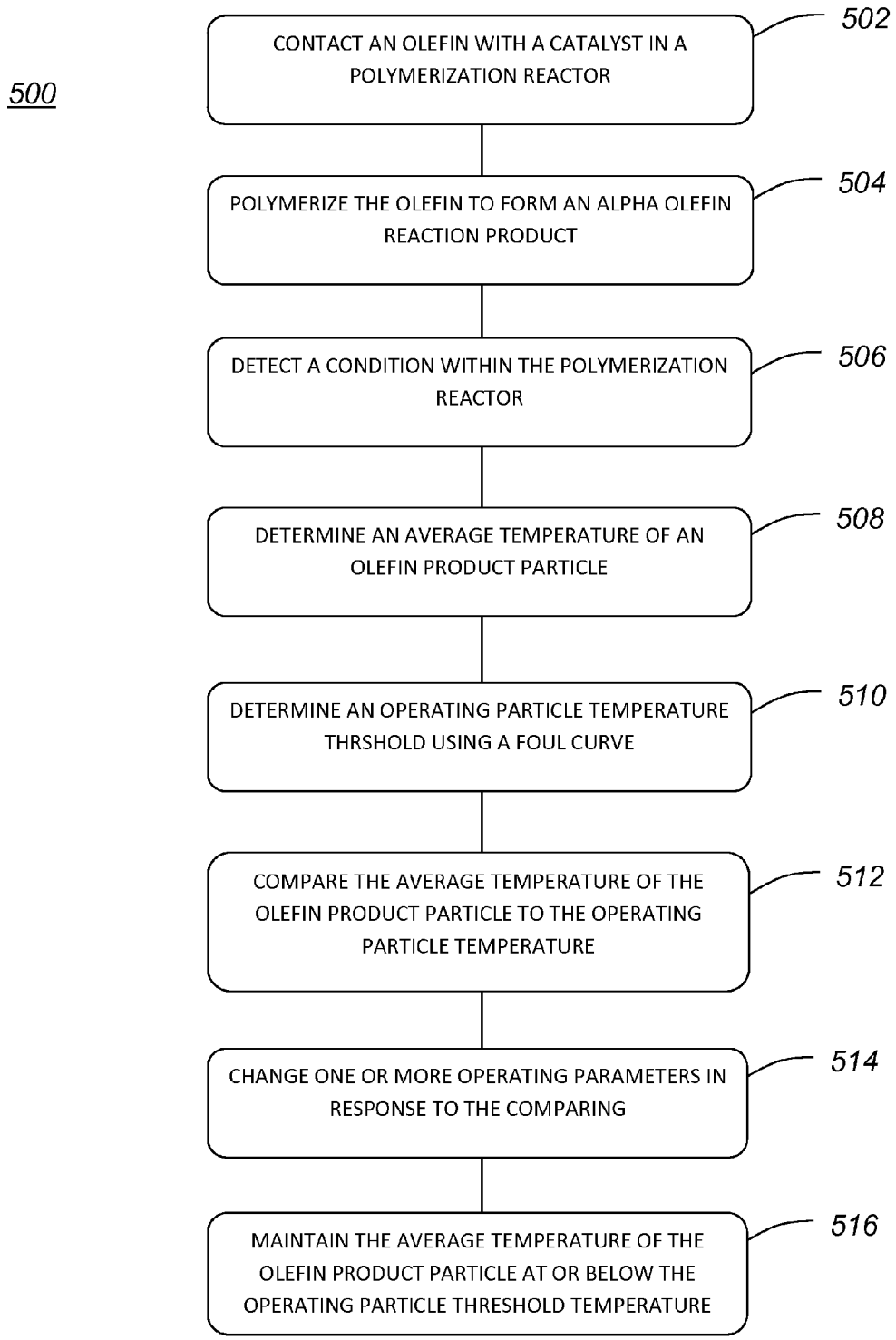
FIG. 5 illustrates a flow chart of an embodiment of a polymerization process.

FIG. 5 illustrates a flow chart of an embodiment of a process 500 for selecting polymerization operating conditions within a polymerization reactor. The process 500 may be carried out within a polymerization reactor (e.g., a loop slurry polymerization reactor, a gas-phase reactor, or combinations thereof). Within the polymerization reactor, an olefin may be contacted with a catalyst in step 502. The contact may result in the polymerization of the olefin to form an alpha olefin reaction product in the form of a plurality of olefin polymer particle, which may be referred to as the polymer particles, in step 504. A single polymer particle may be selected and modeled. Within the reactor, the polymer particle may form a part of the reaction mixture comprising the olefin reactant, the catalyst, a diluent, and the polymer particle.

In step 506, one or more conditions within the polymerization reactor can be measured, detected, or determined using, for example, one or more sensors. Various conditions within the polymerization reactor can be measured, detected or determined including, but not limited to, the bulk fluid temperature, the operating pressure, the reactivity of the catalyst, the reactant concentration (e.g., the olefin concentration within the reactant mixture), the diameter of the catalyst particle (e.g., the average catalyst particle size), the diameter of the polymer particle (e.g., the average polymer particle size), the polymer particle velocity relative to the bulk fluid, and/or the bulk fluid properties (e.g., the thermal conductivity, density, viscosity, or the specific heat). Additional variables and conditions that may affect the polymer particle temperature and that can be measured, detected or determined can include, but are not limited to, a composition of the catalyst, a composition of the olefin, a composition of the alpha olefin reaction product, a ratio of the surface area of the catalyst to a volume of the catalyst, a density of the alpha olefin reaction product, a composition of the diluent, a size of the olefin polymer particle, a dimension of the polymerization reactor, a kinetic profile of the catalyst, an initial catalyst size, a measure of a plurality of reactive sites associated with the catalyst, a pressure within the polymerization reactor, an average temperature of the reaction mixture, a flowrate of the reaction mixture, or any combination thereof. The conditions can be directly or indirectly measured, detected. For an indirect measurement or detection of a condition, one or more measurements or detections may be obtained, and a desired condition can be determined using the measurements in correlations, calculations, and the like to determine the desired condition. In addition, measurements or detections of the fluid properties at the inlet and/or exit of the polymerization reactor(s), with or without any direct internal measurements, may be used to determine one or more conditions within the polymerization reactor. Various considerations listed above can be considered in combination. In an embodiment, the composition and amount of the olefin or olefins in the diluent (e.g., one or more of the non-reactive species) may be considered together. For example, the concentrations of the olefins can affect the polymerization rate and melting temperature of the product polymer while the diluent composition can affect the fouling or threshold temperature of the product polymer in the diluent.

Various sensor types may be used to measure or detect the different conditions within the polymerization reactor. In an embodiment, a temperature sensor may be used to determine the bulk fluid temperature during the polymerization process at one or more locations with the reactor. The catalyst reactivity may be determined using known catalyst testing data. The reactant concentrations may be determined using the flow rates of the components fed into the reactor, the reactant concentrations in the effluent from the reactor, and/or using monitoring of the bulk fluid within the reactor during the polymerization reaction. The catalyst and/or polymer particle diameters may be determined at the time the particles are introduced into the reactor, during the reaction, and/or when the particles are separated from the bulk fluid. The bulk fluid properties can be determined using in-situ measurement devices and/or sample ports that can be used to test samples outside of the active reaction zone.

In step 508, an average temperature of the modeled polymer particle can be determined based on the one or more conditions within the polymerization reactor. This determination may be made by a processor executing a program or application (e.g., a control application). In an embodiment, one or more of the equations described herein may be used to determine the average temperature of the particle $T_p$. The equations may take into account the bulk fluid temperature as well as other parameters associated with the polymerization reactor.

In step 510, an operating particle temperature threshold may be determined using a foul curve. The foul curve may generally relate the properties of a polymer particle and the reactor conditions to the fouling temperature of the polymer particle within the reactor. The operating particle temperature may be less than or equal to the fouling temperature as determined by a foul curve. Operating at or near the fouling temperature may improve the overall conversion of the olefin with the reactor, but due to minor operating temperature fluctuations may result in fouling of the reactor if the temperature exceeds the fouling temperature. The use of the foul curve along with the particle properties and operating conditions may allow the reactor to operate closer to the fouling temperature than using a single operating temperature set point that is considered safe for all polymer particle and reactor conditions. In an embodiment, the ratio of the operating particle temperature threshold to the fouling temperature may be greater than about 0.9, greater than about 0.91, greater than about 0.92, greater than about 0.93, greater than about 0.94, greater than about 0.95, greater than about 0.96, greater than about 0.97, greater than about 0.98, or greater than about 0.99 when the temperatures are compared on an absolute temperature scale (e.g., on a Rankine or Kelvin scale). In some embodiments, the operating particle temperature may be within about 10 degrees Rankine, within about 5 degrees Rankine, within about 3 degrees Rankine, within about 2 degrees Rankine, within about 1 degree Rankine, within about 0.7 degrees Rankine, within about 0.5 degrees Rankine, within about 0.3 degrees Rankine, or within about 0.1 degrees Rankine of the fouling temperature.

In step 512, the average temperature of the polymer particle can be compared to the operating particle temperature threshold determined in step 510. This step may be carried out by a processor executing the control application. In general, the comparing may indicate that the average temperature of the polymer particle is above the operating particle temperature threshold, at the operating particle temperature threshold, or below the operating particle temperature threshold. In some embodiments, the comparing may indicate that the average particle temperature is within a threshold marginal difference from the operating particle temperature threshold. For example, the average temperature of the polymer particle may be within about 1%, within about 2%, within about 3%, within about 4%, within about 5%, within about 7%, or within about 10% of the operating particle temperature threshold (on an absolute temperature scale). The threshold marginal difference may be used to determine the actions taken in response to the temperature comparison.

In step 514, one or more of the operating parameters can be changed in response to the results of the comparing. The changing of the one or more operating parameters may allow the average temperature of the polymer particle to be maintained below the operating particle temperature threshold during the polymerization reaction in step 516. In an embodiment, the average temperature of the polymer particle may be maintained at or near the operating particle temperature threshold. When the average temperature of the polymer particle is below the operating particle temperature by more than a threshold marginal difference, one or more parameters may be changed to increase the average temperature of the polymer particle within the polymerization reactor. For example, when the average temperature of the polymer particle is below the operating particle temperature threshold by more than about 2%, more than about 3%, more than about 4%, more than about 5%, more than about 6%, more than about 7%, more than about 8%, more than about 9%, more than about 10%, or more than about 15% (each on an absolute temperature scale), one or more parameters may be changed to increase the average temperature of the polymer particle within the polymerization reactor.

In an embodiment, one or more parameters may be changed to decrease the average temperature of the polymer particle within the polymerization reactor when the average temperature of the polymer particle is above the operating particle temperature threshold by more than a threshold marginal difference. In general, a temperature above the operating particle temperature threshold may indicate that the polymer particle is at or near a fouling temperature. Various parameters can be adjusted to reduce the average temperature of the polymer particles including, but not limited to, the bulk fluid temperature, the cooling fluid temperature, the cooling fluid flowrate, the olefin concentration in the reaction mixture, the average catalyst particle size in the polymerization reactor, the average polymer particle size in the polymerization reactor, the average polymer particle size introduced into the polymerization reactor, a kinetic profile of the catalyst introduced into the polymerization reactor, an operating pressure within the polymerization reactor, the reactant flowrate into the polymerization reactor, a catalyst kill agent flowrate into the polymerization reactor, and any combination thereof.

In an embodiment, the condition within the polymerization reactor that is detected in step 506 may comprise the bulk fluid temperature ($T_b$). Various parameters may be changed to control the average temperature of the polymer particle when the condition comprises the bulk fluid temperature ($T_b$). In some embodiments, the parameters may include the cooling fluid temperature and/or the cooling fluid flowrate, where the cooling fluid provides indirect heat transfer (e.g., indirect heat removal) with the polymerization reactor. When the comparison with the operating particle temperature threshold indicates that the average temperature of the polymer particle is above the operating particle temperature threshold, the cooling fluid parameters may be changed to lower the cooling fluid temperature and/or increasing the cooling fluid flowrate. This may result in an overall reduction of the bulk fluid temperature along with a decrease in the average particle temperature. The cooling fluid temperature and/or flowrate may then be controlled to maintain the average temperature of the polymer particle. Additional parameters that may be used to control average temperature of the polymer particle can include, but are not limited to, the inlet temperatures of one or more of the components of the slurry, the reactant concentration, the catalyst concentration, and the like.

In an embodiment, the condition within the polymerization reactor that is detected in step 506 may comprise the olefin reactant concentration within the slurry (e.g., the monomer concentration and/or the comonomer concentration, as determined by gas chromatography). Various parameters may be changed to control the average temperature of the polymer particle when the condition comprises olefin reactant concentration. In some embodiments, the parameters may include the amount of olefin reactant fed to the reactor, the amount of catalyst fed to the reactor, the reactivity/kinetic profile of the catalyst fed to the reactor, the amount of diluent fed to the reactor, and/or the amount of one or more inert components fed to the reactor. When the comparison with the operating particle temperature threshold indicates that the average temperature of the polymer particle is above the operating particle temperature threshold, the concentration of the olefin reactant within the reactor may be reduced. The reduced reactant concentration may result in a lower reaction rate and corresponding heat generation within the reactor. This may result in an overall reduction of the average particle temperature. The olefin reactant concentration may then be controlled to maintain the average temperature of the polymer particle.

In an embodiment, the condition within the polymerization reactor that is detected in step 506 may comprise the average catalyst particle size in the polymerization reactor. One or more parameters may be changed to control the average temperature of the polymer particle when the condition comprises the average catalyst particle size, as in step 514. In some embodiments, the parameters may include the average catalyst particle size fed to the polymerization reactor, the selection of a catalyst that breaks apart within the polymerization reactor, and/or one or more operating conditions within the polymerization reactor configured to cause the catalyst particles to break apart during the polymerization reaction (e.g., the slurry flowrate, the operating pressure within the polymerization reactor, the design of the motive device such as the pump impeller within the polymerization reactor, and the like). When the comparison with the operating particle temperature threshold indicates that the average temperature of the polymer particle is above the operating particle temperature threshold, the average size of the catalyst particles may be reduced within the polymerization reactor. Smaller catalyst particles may be expected to have fewer active catalyst sites and react at a slower rate.

In an embodiment, the condition within the polymerization reactor that is detected in step 506 may comprise the average polymer particle size in the polymerization reactor. Various parameters may be changed to control the average temperature of the polymer particle when the condition comprises the average polymer particle size. In some embodiments, the parameters may include the average pre-polymer particle size (if present) fed to the polymerization reactor. The average pre-polymer particle size fed to the polymerization reactor may be based on pre-polymerizing the polymer particles in a pre-reactor and then introducing the polymer particles into the polymerization reactor. When the comparison with the operating particle temperature threshold indicates that the average temperature of the polymer particle is above the operating particle temperature threshold, the average size of the pre-polymer particles introduced into the polymerization reactor may be increased within the polymerization reactor.

In an embodiment, the condition within the polymerization reactor that is detected in step 506 may comprise the operating pressure within the polymerization reactor. When the comparison with the operating particle temperature threshold indicates that the average temperature of the polymer particle is above the operating particle temperature threshold, the operating pressure within the polymerization reactor may be increased above a vapor pressure of the reaction mixture at the average temperature of the polymer particles. This may limit or prevent the formation of a gas region at the surface of the polymer particles, which may cause the average polymer particle temperature to rise above the operating particle temperature threshold.

In an embodiment, the controlled feed of one or more components of the slurry into the polymerization reactor may be used to maintain the average temperature of the olefin polymer particle below the operating particle temperature threshold (step 516). In an embodiment, the process 500 in FIG. 5 may comprise the step of introducing the olefin into the polymerization reactor. When the comparison with the operating particle temperature threshold indicates that the average temperature of the polymer particle is above the operating particle temperature threshold, the introduction of the olefin into the reaction may be reduced, thereby slowing the reaction rate. In some embodiments, the introduction of the olefin, any other reactant, and/or the catalyst into the polymerization reactor may cease when the average temperature of the polymer particle is above the operating particle temperature threshold.

If the average temperature of the polymer particle is above the operating particle temperature threshold, the polymerization reactor may enter a state in which fouling is likely. The polymerization reactor may plug if a sufficient amount of fouling occurs, which may cause the polymerization reactor to be shut down and removed from service in order to remove the accumulated polymer within the reactor. In order to avoid the potential for fouling and/or plugging, the polymerization reaction may be effectively prevented or stopped in some embodiments. For example, a kill agent may be introduced into the polymerization reactor to stop the reaction if the average polymer particle temperature rises above the operating particle temperature threshold by more than a threshold marginal difference. In some embodiments, the polymerization reaction may be stopped if the average temperature of the polymer particles rises above the melting temperature of the polymer product. Stopping the reaction may comprise introducing a kill agent such as water and/or a hydrocarbon comprising one or more hydroxyl groups (e.g., an alcohol, and the like) into the polymerization reactor. A "kill agent" as used herein refers to an agent or composition that may react with the catalyst to reduce/slow or stop the reaction at the catalyst site. The amount of kill agent introduced into the polymerization reactor may be sufficient to react with at least a portion of the catalyst within the polymerization reactor. In some embodiments, the amount of the kill agent introduced into the polymerization reactor may be sufficient to react with all of the active catalyst sites. In some embodiments, the amount of kill agent may be in excess of the amount needed to react with all of the active catalyst sites.

The process 500 for selecting polymerization operating conditions within a polymerization reactor can be repeated for a plurality of particle sizes. The particle sizes may represent the various particle sizes found within the polymerization reactor. Without intending to be limited by theory, the larger polymer particles may be expected to have a lower fouling temperature. The repetition of the process 500 may verify the fouling temperature across the distribution of sizes expected within the polymerization reactor. This may be used to generate a foul curve and/or select and control any operating parameters within the polymerization reactor. The particle modeled would be based on the catalyst particle size of the raw catalyst and knowledge of catalyst activity (or initial polymerization rate) of each size of the catalyst particle size distribution. It may be assumed that the number of catalyst sites is proportional to the volume of the catalyst particle.

Figure 6:
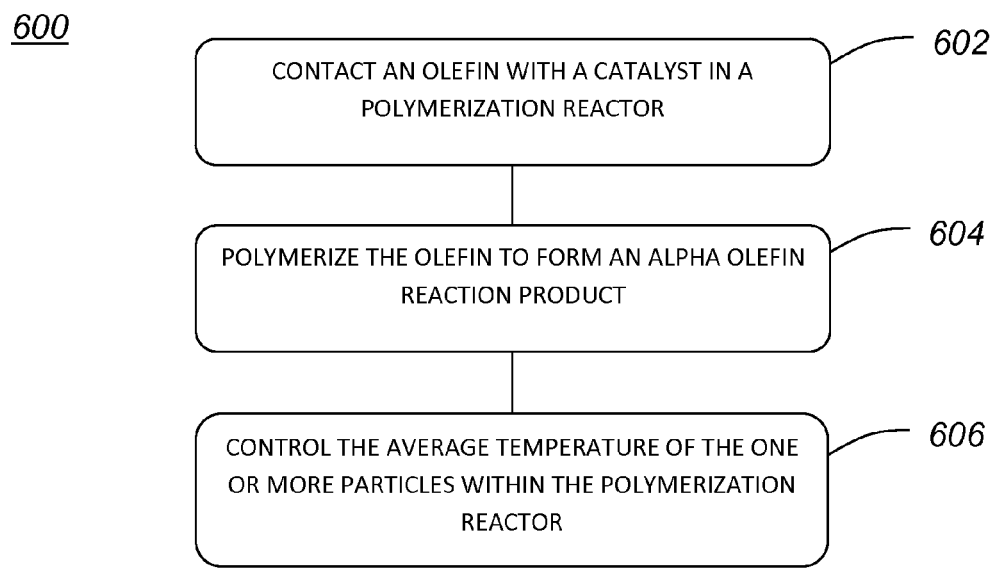
FIG. 6 illustrates a flow chart of another embodiment of a polymerization process.

FIG. 6 illustrates a flow chart of another embodiment of a process 600 for polymerizing an olefin within a polymerization reactor. In some embodiments, one or more steps of the process 600 may be carried by an application stored in a memory and executing on a processor. The process 600 may be carried out within a polymerization reactor (e.g., a loop slurry polymerization reactor, a gas-phase reactor, or any combination thereof). Within the polymerization reactor, an olefin may be contacted with a catalyst in step 602. The contact step 602 may result in the polymerization of the olefin to form an alpha olefin reaction product in the form of an olefin polymer particle, which may be referred to as the polymer particle, in step 604. Within the reactor, the polymer particle may form a part of the reaction mixture comprising the olefin reactant, the catalyst, a diluent, and the polymer particle.

In step 606, the average temperature of one or more of the polymer particles can be controlled within the polymerization reactor. Any of the parameters, conditions, and steps taken to control the average temperature of the polymer particles discussed with respect to the process of FIG. 5 may also be used with the process 600.

In an embodiment, the average temperature of the polymer particles and/or the internal polymerization site temperature may be maintained below the melting temperature of the polymer product. The determination of the average temperature and/or the internal polymerization site temperature may allow the polymerization reactor to operate near the melting temperature of the polymer particles without fouling the reactor, which may improve the reactor performance in some embodiments. The average temperature of the polymer particles may also be recalculated and determined based on the properties of the polymer particles and the reactor conditions during the polymerization reactor. In an embodiment, the ratio of the average temperature of the polymer particles to the melting temperature of the product polymer (e.g., the melting temperature of the alpha olefin reaction product) may be greater than about 0.9, greater than about 0.91, greater than about 0.92, greater than about 0.93, greater than about 0.94, greater than about 0.95, greater than about 0.96, greater than about 0.97, greater than about 0.98, or greater than about 0.99 when the temperatures are compared on an absolute temperature scale (e.g., on a Rankine or Kelvin scale).

During the polymerization process, the alpha olefin reaction product may form around a catalyst site to form an individual polymer particle, which may be one of a plurality of polymer particles resulting from the polymerization process. As the polymerization reaction proceeds, the alpha olefin reaction product may continue to develop on the polymer particle and increase its diameter. The heat of the polymerization may be released at the polymerization site and travel through the remaining polymer product to the exterior of the polymer particle. The temperature within the polymer particle (e.g., at the polymerization site) may have a temperature that is within about 5%, within about 4%, within about 3%, within about 2%, or within about 1% of the melting temperature of the alpha olefin reaction product (e.g., the polymer product melting temperature). In some embodiments, the temperature may be equal to or above the melting temperature of the alpha olefin reaction product.

In an embodiment, controlling the average temperature of the polymer particle may include maintaining a temperature differential between the polymer particle and the surrounding bulk fluid within the polymerization reactor. The temperature differential may ensure that heat is transferred from the polymer particles into the bulk fluid. The temperature differential may be expressed as a ratio of the average reaction mixture temperature (e.g., the temperature of the bulk fluid comprising the diluent, olefin and/or the reactant) to the average temperature of one or more of the polymer particles, which may be maintained at less than about 0.95, less than about 0.90, less than about 0.85, or less than about 0.80 when the temperatures are compared on an absolute temperature scale.

The average temperature of the polymer particles may be controlled through the control of the size of the polymer particles entering the polymerization reactor. As the polymer particles increase in size, the surface area of the polymer particles may increase to allow the heat of polymerization to be removed without excessive melting of the polymer product. In order to form the polymer particles, an alpha olefin reaction product may be formed in a pre-polymerization reactor under a first set of conditions. The first set of conditions may operate a lower temperature than the polymerization reactor to allow the smaller polymer particles to form while maintaining the average temperature of the polymer particles below the melting temperature. Once formed, the pre-polymer particles may be separated and introduced into the polymerization reactor. Due to the size of the pre-formed pre-polymer particles, the polymerization reactor may be operated under conditions such that the average temperature of the polymer particles is near the melting temperature or fouling temperature.

FIG. 7 illustrates another flow chart of still another embodiment of a process 700 for polymerizing an olefin within a polymerization reactor. In some embodiments, one or more steps of the process 700 may be carried by an application stored in a memory and executing on a processor. The process 700 may be carried out within a polymerization reactor (e.g., one or more loop slurry polymerization reactors, a gas-phase reactor, or a combination thereof). The process 700 may begin by calculating an alpha olefin product particle (e.g., a polymer particle) internal temperature of a modeled polymer particle based on one or more alpha olefin product particle properties and an average temperature of a bulk fluid 414 surrounding the alpha olefin product particle in step 702. The alpha olefin product particle properties may include, but are not limited to, the diameter of the catalyst particle (e.g., the average catalyst particle size), the diameter of the polymer particle (e.g., the average polymer particle size), the polymer particle velocity relative to the bulk fluid, a composition of the catalyst, a composition of the alpha olefin reaction product, a ratio of the surface area of the catalyst to a volume of the catalyst, a density of the alpha olefin reaction product, a solubility of the diluent in the alpha olefin product, or any combination thereof.

In step 704, one or more polymerization reactor operating parameters can be determined based on the alpha olefin product particle internal temperature. In an embodiment, the one or more reactor operating parameters may include, but are not limited to, the bulk fluid temperature, the operating pressure, the reactivity of the catalyst, the reactant concentration (e.g., the olefin concentration within the reactant mixture), a composition of the catalyst, a composition of the olefin, a composition of the diluent, a dimension of the polymerization reactor, a catalyst kinetic profile of the catalyst, an initial catalyst size, a measure of a plurality of reactive sites associated with the catalyst, a flowrate of the reaction mixture, a cooling fluid flowrate, a cooling fluid temperature, an indirect contact area between the cooling fluid and the reactor, or any combination thereof.

In step 706, one or more polymerization reactor operating parameters can be controlled. In step 708, a ratio of a melting temperature of the alpha olefin product particle to the alpha olefin product particle internal temperature can be maintained at a value less than about 1.0 in response to controlling the one or more polymerization reactor operating parameters. Any of the parameters, conditions, and steps taken to control the temperatures of the polymer particles discussed with respect to the processes of FIG. 5 and/or FIG. 6 may also be used with the process 700.

In an embodiment, the polymerization reactor operating parameters can include, but are not limited to, an olefin concentration within the polymerization reactor. Controlling the olefin concentration within the polymerization reactor can include maintaining the olefin concentration at or below a predetermined threshold value, which may allow the rate of polymerization to be controlled along with the rate of the release of the heat of polymerization. In some embodiments, the one or more polymerization reactor operating parameters can include a pressure within the polymerization reactor. In this embodiment, controlling the pressure can include maintaining the pressure at or above a vapor pressure of the bulk fluid at the alpha olefin product particle internal temperature.

In some embodiments, the one or more polymerization reactor operating parameters can include an average catalyst particle size within the polymerization reactor. Controlling the average catalyst particle size within the reactor can include maintaining flow conditions within the polymerization reactor to break apart the catalyst product particles and maintain the average catalyst particle size below a predetermined threshold. The flow conditions can be controlled in a variety of ways including maintaining a fluid velocity in the polymerization reactor above a threshold and/or maintaining a pump load above a threshold. The reactivity, number of active catalyst sites on each catalyst particle, and initial catalyst particle size fed to the polymerization reactor can also be controlled to maintain the alpha olefin product particle internal temperature less than the melting temperature.

The process 700 can also include generating a foul curve and using the foul curve during the polymerization process. The foul curve can relate an alpha olefin product particle diameter to a fouling temperature of the alpha olefin product particle within the polymerization reactor. In an embodiment, the one or more alpha olefin product particle properties can include a plurality of alpha olefin product particle diameters. For example, the properties can include a first alpha olefin product particle diameter and a second alpha olefin product particle diameter. When a plurality of diameters are present, calculating the alpha olefin product particle internal temperature can include calculating a first alpha olefin product particle internal temperature at the first alpha olefin product particle diameter, and calculating a second alpha olefin product particle internal temperature at the second alpha olefin product particle diameter. The foul curve can then be generated based on the calculated alpha olefin product particle internal temperatures at the respective polymerization reactor operating temperatures.

The foul curve may allow the fouling temperature as measured by the bulk fluid temperature to be determined at different alpha olefin product particle diameters. During operation, the average diameter of the alpha olefin product particle diameter can be determined and the bulk fluid temperature can be determined using the foul curve. The fouling temperature can then be determined and used to control one or more properties within the polymerization reactor.

In a continuous process, the foul curve can be used to determine the fouling temperature for the largest alpha olefin product particles, which may have the lowest expected fouling temperature. In some embodiments, the fouling temperature may be determined based on an average of the smallest particles. Considerations such as the pre-polymerizing the alpha olefin product particles may be used to increase the diameter of the polymer particles and thereby the fouling temperature. For batch operations, the fouling temperature may increase during the duration of the polymerization reaction due to the increasing size of the alpha olefin product particles. In a batch reaction, the bulk fluid temperature may be controlled based on the increasing fouling temperature during the polymerization reaction run time.

Figure 8:
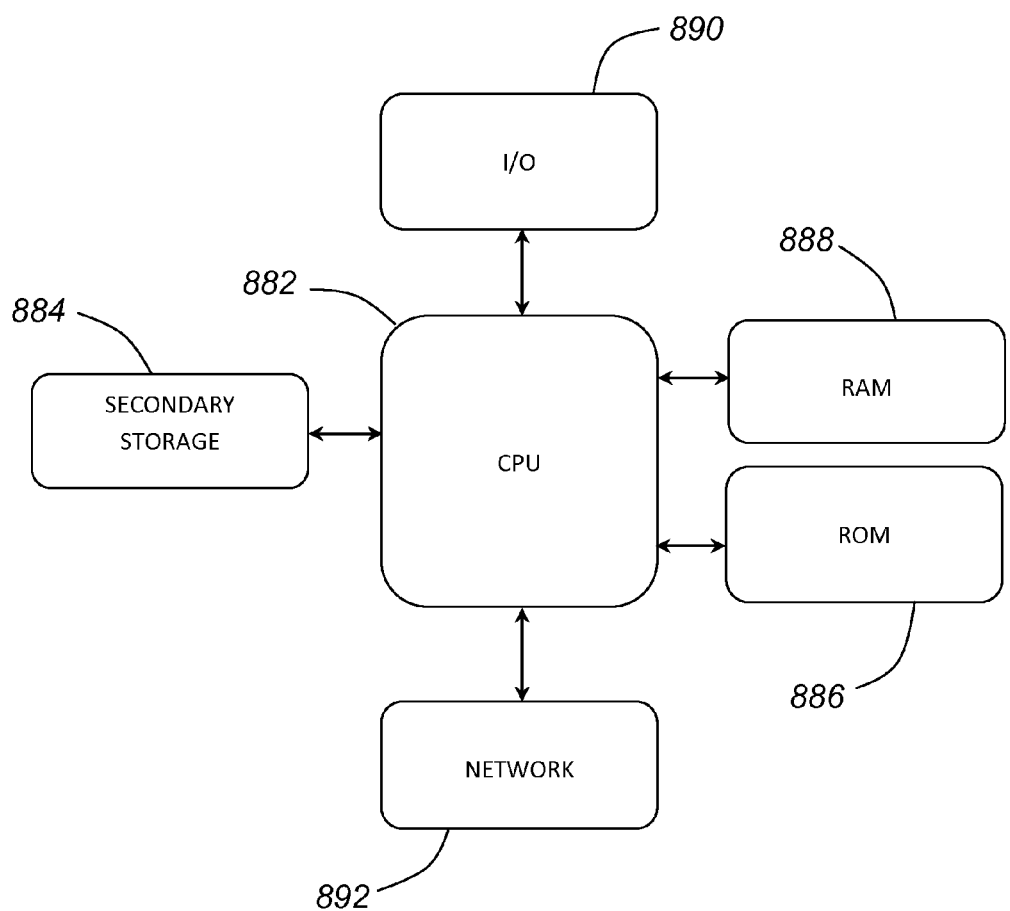
FIG. 8 illustrates a schematic layout of a computer system.

FIG. 8 illustrates an exemplary computer system 880 suitable for implementing one or more embodiments disclosed herein. In an embodiment, the computer system 880 may be used to store and/or execute one or more control programs used with the polymerization reactor and/or the polymerization reactor control module. The computer system 880 includes a processor 882 (which may be referred to as a central processor unit or CPU) that is in communication with memory devices including secondary storage 884, read only memory (ROM) 886, random access memory (RAM) 888, input/output (I/O) devices 890, and network connectivity devices 892. The processor 882 may be implemented as one or more CPU chips.

It is understood that by programming and/or loading executable instructions onto the computer system 880, at least one of the CPU 882, the RAM 888, and the ROM 886 are changed, transforming the computer system 880 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 884 is typically comprised of one or more disk drives or tape drives and is used for non-volatile storage of data and as an over-flow data storage device if RAM 888 is not large enough to hold all working data. Secondary storage 884 may be used to store programs which are loaded into RAM 888 when such programs are selected for execution. The ROM 886 is used to store instructions and perhaps data which are read during program execution. ROM 886 is a non-volatile memory device which typically has a small memory capacity relative to the larger memory capacity of secondary storage 884. The RAM 888 is used to store volatile data and perhaps to store instructions. Access to both ROM 886 and RAM 888 is typically faster than to secondary storage 884. The secondary storage 884, the RAM 888, and/or the ROM 886 may be referred to in some contexts as computer readable storage media and/or non-transitory computer readable media.

I/O devices 890 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 892 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 892 may enable the processor 882 to communicate with the Internet and/or one or more intranets. With such a network connection, it is contemplated that the processor 882 might receive information from the network, or might output information to the network in the course of performing the above-described method steps. Such information, which is often represented as a sequence of instructions to be executed using processor 882, may be received from and outputted to the network, for example, in the form of a computer data signal embodied in a carrier wave.

Such information, which may include data or instructions to be executed using processor 882 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 882 executes instructions, codes, computer programs, scripts which it accesses from hard disk, floppy disk, optical disk (these various disk based systems may all be considered secondary storage 884), ROM 886, RAM 888, or the network connectivity devices 892. While only one processor 882 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 884, for example, hard drives, floppy disks, optical disks, and/or other device, the ROM 886, and/or the RAM 888 may be referred to in some contexts as non-transitory instructions and/or non-transitory information.

In an embodiment, the computer system 880 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 880 to provide the functionality of a number of servers that is not directly bound to the number of computers in the computer system 880. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 880, at least portions of the contents of the computer program product to the secondary storage 884, to the ROM 886, to the RAM 888, and/or to other non-volatile memory and volatile memory of the computer system 880. The processor 882 may process the executable instructions and/or data structures in part by directly accessing the computer program product, for example by reading from a CD-ROM disk inserted into a disk drive peripheral of the computer system 880. Alternatively, the processor 882 may process the executable instructions and/or data structures by remotely accessing the computer program product, for example by downloading the executable instructions and/or data structures from a remote server through the network connectivity devices 892. The computer program product may comprise instructions that promote the loading and/or copying of data, data structures, files, and/or executable instructions to the secondary storage 884, to the ROM 886, to the RAM 888, and/or to other non-volatile memory and volatile memory of the computer system 880.

In some contexts, the secondary storage 884, the ROM 886, and the RAM 888 may be referred to as a non-transitory computer readable medium or a computer readable storage media. A dynamic RAM embodiment of the RAM 888, likewise, may be referred to as a non-transitory computer readable medium in that while the dynamic RAM receives electrical power and is operated in accordance with its design, for example during a period of time during which the computer system 880 is turned on and operational, the dynamic RAM stores information that is written to it. Similarly, the processor 882 may comprise an internal RAM, an internal ROM, a cache memory, and/or other internal non-transitory storage blocks, sections, or components that may be referred to in some contexts as non-transitory computer readable media or computer readable storage media.

Processes and systems for the balancing the resistances to heat transfer during a polymerization process in a loop polymerization reactor such as a loop slurry reactor and/or gas phase reactor have been described. The following are a first set of non-limiting, specific embodiments in accordance with the present disclosure:

In a first embodiment, polymerization process comprises contacting an olefin with a catalyst in a polymerization reactor, polymerizing at least a portion of the olefin to form an alpha olefin reaction product, detecting, by sensor, a condition within the polymerization reactor, determining, by a processor, an average temperature of at least one olefin polymer particle of the plurality of olefin polymer particles based on the condition, determining an operating particle temperature threshold using a foul curve, comparing, by the processor, the average temperature of the at least one olefin polymer particle to the operating particle temperature threshold, changing one or more operating parameters in response to the comparing, and maintaining the average temperature of the at least one olefin polymer particle at or below the operating particle temperature threshold in response to changing the one or more operating parameters. The alpha olefin reaction product is in the form of a plurality of olefin polymer particles, and the polymerization reactor comprises a reaction mixture comprising the olefin, the catalyst, a diluent, and the alpha olefin reaction product.

A second embodiment may include the method of the first embodiment, wherein the condition comprises a bulk fluid temperature, wherein changing the one or more operating parameters comprises at least one of changing a cooling fluid temperature or flowrate, and wherein the cooling fluid cools at least a portion of an exterior of the polymerization reactor.

A third embodiment may include the method of second embodiment, wherein the comparing comprises determining that the average temperature of the olefin polymer particle is above the operating particle temperature threshold, and wherein changing the one or more operating parameters comprises at least one of lowering a cooling fluid temperature or increasing a cooling fluid flowrate.

A fourth embodiment may include the method of any of the first to third embodiments, wherein the condition comprises a concentration of the olefin in the reaction mixture, and wherein changing the one or more operating parameters comprises changing the olefin concentration in the reaction mixture.

A fifth embodiment may include the method of the fourth embodiment, wherein the comparing comprises determining that the average temperature of the olefin polymer particle is above the operating particle temperature threshold, and wherein changing the one or more operating parameters comprises reducing the olefin concentration in the reaction mixture.

A sixth embodiment may include the method of any of the first to fifth embodiments, wherein the catalyst comprises a catalyst particle, wherein the condition comprises an average catalyst particle size in the polymerization reactor, and wherein changing the one or more operating parameters comprises changing the average catalyst particle size within the polymerization reactor.

A seventh embodiment may include the method of the sixth embodiment, wherein the comparing comprises determining that the average temperature of the olefin polymer particle is above the operating particle temperature threshold, and wherein changing the one or more operating parameters comprises reducing the average catalyst particle size within the polymerization reactor.

An eighth embodiment may include the method of any of the first to seventh embodiments, wherein the condition comprises an average olefin polymer particle size in the polymerization reactor, and wherein changing the one or more operating parameters comprises changing the average olefin polymer particle size within the polymerization reactor.

A ninth embodiment may include the method of the eight embodiment, wherein the comparing comprises determining that the average temperature of the olefin polymer particle is above the operating particle temperature threshold, and wherein changing the one or more operating parameters comprises forming a pre-polymer particle comprising the catalyst, and introducing the pre-polymer particle to the polymerization reactor.

A tenth embodiment may include the method of any of the first to ninth embodiments, wherein the condition comprises an operating pressure in the polymerization reactor, and wherein changing the one or more operating parameters comprises changing the pressure within the polymerization reactor.

An eleventh embodiment may include the method of the tenth embodiment, wherein the comparing comprises determining that the average temperature of the olefin polymer particle is above the operating particle temperature threshold, and wherein changing the one or more operating parameters comprises increasing the operating pressure in the polymerization reactor to a pressure above a vapor pressure of the reaction mixture at the average temperature of the olefin polymer particle.

A twelfth embodiment may include the method of any of the first to eleventh embodiments, wherein determining the average temperature of the olefin polymer particle is further based on at least one of: a composition of the catalyst, a composition of the olefin, a composition of the alpha olefin reaction product, a ratio of a surface area of the catalyst to a volume of the catalyst, a density of the alpha olefin reaction product, a composition of the diluent, a size of the olefin polymer particle, a dimension of the polymerization reactor, a kinetic profile of the catalyst, an initial catalyst size, a measure of a plurality of reactive sites associated with the catalyst, a pressure within the polymerization reactor, an average temperature of the reaction mixture, a flowrate of the reaction mixture, or any combination thereof.

A thirteenth embodiment may include the method of any of the first to twelfth embodiments, where the method may also include continuously introducing the olefin into the polymerization reactor.

A fourteenth embodiment may include the method of the thirteenth embodiment, wherein the comparing comprises determining that the average temperature of the olefin polymer particle is above the operating particle temperature threshold, and wherein changing the one or more operating parameters comprises ceasing the introduction of the olefin into the polymerization reactor.

A fifteenth embodiment may include the method of any of the first to fourteenth embodiments, wherein the comparing comprises determining that the average temperature of the olefin polymer particle is above the operating particle temperature threshold, and wherein changing the one or more operating parameters comprises introducing water into the polymerization reactor.

A sixteenth embodiment may include the method of any of the first to fifteenth embodiments, wherein the comparing comprises determining that the average temperature of the olefin polymer particle is above the operating particle temperature threshold, and wherein changing the one or more operating parameters comprises introducing hydrocarbon comprising one or more hydroxyl groups into the polymerization reactor.

A seventeenth embodiment may include the method of any of the first to sixteenth embodiments, wherein the polymerization reactor is a loop slurry reactor or gas phase reactor.

In an eighteenth embodiment, a polymerization process comprises contacting an olefin with a catalyst in a polymerization reactor, polymerizing the olefin to form an alpha olefin reaction product, and controlling an average temperature of one or more particles of a plurality of particles of the alpha olefin reaction product within the polymerization reactor. The alpha olefin reaction product is in the form of a plurality of particles, and the polymerization reactor comprises a reaction mixture comprising the olefin, the catalyst, a diluent, and the alpha olefin reaction product. The average temperature of the one or more particles of the plurality of particles is less than the melting temperature of the alpha olefin reaction product, and a ratio of the average temperature of the one or more particles of the plurality of particles to the melting temperature of the alpha olefin reaction product is greater than about 0.9.

A nineteenth embodiment may include the polymerization process of the eighteenth embodiment, wherein each of the one or more particles of the plurality of particles comprise a catalyst polymerization site having the alpha olefin reaction product disposed about the catalyst polymerization site, and wherein a temperature of the catalyst polymerization site is within about 5% of the melting temperature of the alpha olefin reaction product.

A twentieth embodiment may include the polymerization process of the eighteenth embodiment, wherein each of the one or more particles of the plurality of particles comprise a catalyst polymerization site having the alpha olefin reaction product disposed about the catalyst polymerization site, and wherein a temperature of the catalyst polymerization site is equal to or above the melting temperature of the alpha olefin reaction product.

A twenty first embodiment may include the polymerization process of any of the eighteenth to twentieth embodiments, wherein controlling the average temperature of the one or more particles comprises: controlling a ratio of an average reaction mixture temperature to the average temperature of the one or more particles of the plurality of particles, wherein the ratio is less than about 0.95.

A twenty second embodiment may include the polymerization process of any of the eighteenth to twenty first embodiments, wherein controlling the average temperature of the one or more particles of the plurality of particles comprises: controlling an olefin concentration in the reaction mixture.

A twenty third embodiment may include the polymerization process of any of the eighteenth to twenty second embodiments, wherein controlling the average temperature of the one or more particles of the plurality of particles comprises: operating the polymerization reactor at a first pressure, wherein the first pressure is greater than the vapor pressure of the reaction mixture at the average temperature of the one or more particles of the plurality of particles.

A twenty fourth embodiment may include the polymerization process of any of the eighteenth to twenty third embodiments, wherein the catalyst comprises catalyst particles, and wherein controlling the average temperature of the one or more particles of the plurality of particles comprises: breaking the catalyst particle into two or more smaller particles.

A twenty fifth embodiment may include the polymerization process of any of the eighteenth to twenty fourth embodiments, wherein controlling the average temperature of the one or more particles of the plurality of particles comprises: forming a pre-polymer product in a pre-polymerization reactor, wherein the pre-polymer product formed in the pre-polymerization reactor comprises a plurality of pre-polymer particles; separating the plurality of pre-polymer particles, and introducing the plurality of pre-polymer particles into the polymerization reactor.

A twenty sixth embodiment may include the polymerization process of any of the eighteenth to twenty fifth embodiments, wherein controlling the average temperature of the one or more particles of the plurality of particles comprises: controlling the amount of active sites on the catalyst.

A twenty seventh embodiment may include the polymerization process of any of the eighteenth to twenty sixth embodiments, wherein controlling the average temperature of the one or more particles of the plurality of particles comprises: polymerizing the olefin using the catalyst, wherein the catalyst comprises a kinetic profile that changes during the polymerization process; and changing a polymerization reaction rate during the polymerizing of the olefin based on the kinetic profile that changes.

A twenty eighth embodiment may include the polymerization process of any of the eighteenth to twenty seventh embodiments, wherein the catalyst is in particulate form, and wherein controlling the average temperature of the one or more particles of the plurality of particles comprises: controlling a ratio of a surface area of the catalyst to a volume of the catalyst to greater than a threshold.

In a twenty ninth embodiment, a polymerization process comprises calculating an alpha olefin product particle internal temperature within a polymerization reactor based on one or more alpha olefin product particle properties and an average temperature of a bulk fluid surrounding the alpha olefin product particle within the polymerization reactor; determining one or more polymerization reactor operating parameters based on the alpha olefin product particle internal temperature; controlling the one or more polymerization reactor operating parameters; and maintaining a ratio of the alpha olefin product particle internal temperature to a melting temperature of the alpha olefin product particle at a value less than about 1.0 in response to controlling the one or more polymerization reactor operating parameters.

A thirtieth embodiment may include the polymerization process of the twenty ninth embodiment, wherein the one or more alpha olefin product particle properties comprise a first alpha olefin product particle diameter and a second alpha olefin product particle diameter, and wherein calculating the alpha olefin product particle internal temperature comprises: calculating a first alpha olefin product particle internal temperature at the first alpha olefin product particle diameter; calculating a second alpha olefin product particle internal temperature at the second alpha olefin product particle diameter; and generating a foul curve based on the first alpha olefin product particle internal temperature, the second alpha olefin product particle internal temperature, the first alpha olefin product particle diameter, and the second alpha olefin product particle diameter, wherein the foul curve relates an alpha olefin product particle diameter to a fouling temperature of the alpha olefin product particle within the polymerization reactor.

A thirty first embodiment may include the polymerization process of the thirtieth embodiment, wherein controlling the one or more polymerization reactor operating parameters comprises: controlling the average temperature of the bulk fluid using the foul curve.

A thirty second embodiment may include the polymerization process of any of the twenty ninth to thirty first embodiments, wherein the one or more polymerization reactor operating parameters comprise an olefin concentration within the polymerization reactor, and wherein controlling the one or more polymerization reactor operating parameters comprises maintaining the olefin concentration at or below a predetermined threshold value.

A thirty third embodiment may include the polymerization process of any of the twenty ninth to thirty second embodiments, wherein the one or more polymerization reactor operating parameters comprise a pressure within the polymerization reactor, and wherein controlling the one or more polymerization reactor operating parameters comprises maintaining the pressure at or above a vapor pressure of the bulk fluid at the alpha olefin product particle internal temperature.

A thirty fourth embodiment may include the polymerization process of any of the twenty ninth to thirty third embodiments, wherein the one or more polymerization reactor operating parameters comprise an average alpha olefin product particle size within the polymerization reactor, and wherein controlling the one or more polymerization reactor operating parameters comprises maintaining the average alpha olefin product particle size above a predetermined threshold.

A thirty fifth embodiment may include the polymerization process of any of the twenty ninth to thirty fourth embodiments, wherein the one or more polymerization reactor operating parameters comprise an average catalyst particle size within the polymerization reactor, and wherein controlling the one or more polymerization reactor operating parameters comprises maintaining flow conditions within the polymerization reactor to maintain the average catalyst particle size below a predetermined threshold.

A thirty sixth embodiment may include the polymerization process of the thirty fifth embodiment, wherein maintaining the flow conditions within the polymerization reactor comprises maintaining a fluid velocity in the polymerization reactor above a threshold.

A thirty seventh embodiment may include the polymerization process of the thirty fifth or thirty sixth embodiment, where the process may also include pumping the bulk fluid through the polymerization reactor using a pump having a pump load, and wherein maintaining the flow conditions within the polymerization reactor comprises maintaining the pump load above a threshold.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the disclosure is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A polymerization process comprising:
    contacting an olefin with a catalyst in a polymerization reactor;
    polymerizing at least a portion of the olefin to form an alpha olefin reaction product, wherein the alpha olefin reaction product is in the form of a plurality of olefin polymer particles, wherein the polymerization reactor comprises a reaction mixture comprising the olefin, the catalyst, a diluent, and the alpha olefin reaction product;
    detecting, by sensor, a condition within the polymerization reactor;
    determining, by a processor, an average temperature of at least one olefin polymer particle of the plurality of olefin polymer particles based on the condition;
    determining an operating particle temperature threshold using a foul curve;
    comparing, by the processor, the average temperature of the at least one olefin polymer particle to the operating particle temperature threshold;
    changing one or more operating parameters in response to the comparing; and
    maintaining the average temperature of the at least one olefin polymer particle at or below the operating particle temperature threshold in response by changing the one or more operating parameters.

2. The method of claim 1, wherein the condition comprises a bulk fluid temperature, wherein changing the one or more operating parameters comprises at least one of changing a cooling fluid temperature or flowrate, and wherein the cooling fluid cools at least a portion of an exterior of the polymerization reactor.

3. The method of claim 2, wherein the comparing comprises determining that the average temperature of the olefin polymer particle is above the operating particle temperature threshold, and wherein changing the one or more operating parameters comprises at least one of lowering a cooling fluid temperature or increasing a cooling fluid flowrate.

4. The method of claim 1, wherein the condition comprises a concentration of the olefin in the reaction mixture, and wherein changing the one or more operating parameters comprises changing the olefin concentration in the reaction mixture.

5. The method of claim 1, wherein the catalyst comprises a catalyst particle, wherein the condition comprises an average catalyst particle size in the polymerization reactor, and wherein changing the one or more operating parameters comprises changing the average catalyst particle size within the polymerization reactor.

6. The method of claim 5, wherein the comparing comprises determining that the average temperature of the olefin polymer particle is above the operating particle temperature threshold, and wherein changing the one or more operating parameters comprises reducing the average catalyst particle size within the polymerization reactor.

7. The method of claim 1, wherein the condition comprises an average olefin polymer particle size in the polymerization reactor, and wherein changing the one or more operating parameters comprises changing the average olefin polymer particle size within the polymerization reactor.

8. The method of claim 7, wherein the comparing comprises determining that the average temperature of the olefin polymer particle is above the operating particle temperature threshold, and wherein changing the one or more operating parameters comprises forming a pre-polymer particle comprising the catalyst, and introducing the pre-polymer particle to the polymerization reactor.

9. The method of claim 1, wherein the condition comprises an operating pressure in the polymerization reactor, and wherein changing the one or more operating parameters comprises changing the pressure within the polymerization reactor.

10. The method of claim 9, wherein the comparing comprises determining that the average temperature of the olefin polymer particle is above the operating particle temperature threshold, and wherein changing the one or more operating parameters comprises increasing the operating pressure in the polymerization reactor to a pressure above a vapor pressure of the reaction mixture at the average temperature of the olefin polymer particle.

11. The method of claim 1, wherein determining the average temperature of the olefin polymer particle is further based on at least one of: a composition of the catalyst, a composition of the olefin, a composition of the alpha olefin reaction product, a ratio of a surface area of the catalyst to a volume of the catalyst, a density of the alpha olefin reaction product, a composition of the diluent, a size of the olefin polymer particle, a dimension of the polymerization reactor, a kinetic profile of the catalyst, an initial catalyst particle size, a measure of a plurality of reactive sites associated with the catalyst, a pressure within the polymerization reactor, an average temperature of the reaction mixture, a flowrate of the reaction mixture, or any combination thereof.

12. The method of claim 1, wherein the comparing comprises determining that the average temperature of the olefin polymer particle is above the operating particle temperature threshold, and wherein changing the one or more operating parameters comprises ceasing the introduction of the olefin into the polymerization reactor.

13. The method of claim 1, wherein the comparing comprises determining that the average temperature of the olefin polymer particle is above the operating particle temperature threshold, and wherein changing the one or more operating parameters comprises introducing water into the polymerization reactor.

14. A polymerization process comprising:
    contacting an olefin with a catalyst in a polymerization reactor;
    polymerizing the olefin to form an alpha olefin reaction product, wherein the alpha olefin reaction product is in the form of a plurality of particles, wherein the polymerization reactor comprises a reaction mixture comprising the olefin, the catalyst, a diluent, and the alpha olefin reaction product; and
    controlling an average temperature of one or more particles of the plurality of particles within the polymerization reactor, wherein the average temperature of the one or more particles of the plurality of particles is less than the melting temperature of the alpha olefin reaction product, and wherein a ratio of the average temperature of the one or more particles of the plurality of particles to the melting temperature of the alpha olefin reaction product is greater than about 0.9.

15. The polymerization process of claim 14, wherein controlling the average temperature of the one or more particles comprises: controlling a ratio of an average reaction mixture temperature to the average temperature of the one or more particles of the plurality of particles, wherein the ratio is less than about 0.95.

16. The polymerization process of claim 14, wherein controlling the average temperature of the one or more particles of the plurality of particles comprises: controlling an olefin concentration in the reaction mixture.

17. The polymerization process of claim 14, wherein controlling the average temperature of the one or more particles of the plurality of particles comprises: operating the polymerization reactor at a first pressure, wherein the first pressure is greater than the vapor pressure of the reaction mixture at the average temperature of the one or more particles of the plurality of particles.

18. The polymerization process of claim 14, wherein controlling the average temperature of the one or more particles of the plurality of particles comprises:
forming a pre-polymer product in a pre-polymerization reactor, wherein the pre-polymer product formed in the pre-polymerization reactor comprises a plurality of pre-polymer particles;
separating the plurality of pre-polymer particles, and
introducing the plurality of pre-polymer particles into the polymerization reactor.

19. The polymerization process of claim 14, wherein controlling the average temperature of the one or more particles of the plurality of particles comprises; controlling the amount of active sites on the catalyst.

20. The polymerization process of claim 14, wherein controlling the average temperature of the one or more particles of the plurality of particles comprises: polymerizing the olefin using the catalyst, wherein the catalyst comprises a kinetic profile that changes during the polymerization process; and changing a polymerization reaction rate during the polymerizing of the olefin based on the kinetic profile that changes.

21. The polymerization process of claim 14, wherein the catalyst is in particulate form, and wherein controlling the average temperature of the one or more particles of the plurality of particles comprises: controlling a ratio of a surface area of the catalyst to a volume of the catalyst to greater than a threshold.

22. A polymerization process comprising:
calculating an alpha olefin product particle internal temperature within a polymerization reactor based on one or more alpha olefin product particle properties and an average temperature of a bulk fluid surrounding the alpha olefin product particle within the polymerization reactor;
determining one or more polymerization reactor operating parameters based on the alpha olefin product particle internal temperature;
controlling the one or more polymerization reactor operating parameters; and
maintaining a ratio of the alpha olefin product particle internal temperature to a melting temperature of the alpha olefin product particle to a value less than about 1.0 in response to controlling the one or more polymerization reactor operating parameters.

23. The polymerization process of claim 22, wherein the one or more alpha olefin product particle properties comprise a first alpha olefin product particle diameter and a second alpha olefin product particle diameter, and wherein calculating the alpha olefin product particle internal temperature comprises:
calculating a first alpha olefin product particle internal temperature at the first alpha olefin product particle diameter;
calculating a second alpha olefin product particle internal temperature at the second alpha olefin product particle diameter; and
generating a foul curve based on the first alpha olefin product particle internal temperature, the second alpha olefin product particle internal temperature, the first alpha olefin product particle diameter, and the second alpha olefin product particle diameter, wherein the foul curve relates an alpha olefin product particle diameter to a fouling temperature of the alpha olefin product particle within the polymerization reactor.

24. The polymerization process of claim 23, wherein controlling the one or more polymerization reactor operating parameters comprises: controlling the average temperature of the bulk fluid using the foul curve.

25. The polymerization process of claim 22, wherein the one or more polymerization reactor operating parameters comprise an olefin concentration within the polymerization reactor, and wherein controlling the one or more polymerization reactor operating parameters comprises maintaining the olefin concentration at or below a predetermined threshold value.

26. The polymerization process of claim 22, wherein the one or more polymerization reactor operating parameters comprise an average alpha olefin product particle size within the polymerization reactor, and wherein controlling the one or more polymerization reactor operating parameters comprises maintaining the average alpha olefin product particle size above a predetermined threshold.

27. The polymerization process of claim 22, wherein controlling the one or more polymerization reactor operating parameters comprises maintaining flow conditions within the polymerization reactor to maintain an average catalyst particle size below a predetermined threshold, and wherein maintaining the flow conditions within the polymerization reactor comprises maintaining a fluid velocity in the polymerization reactor above a threshold.

* * * * *